(12) United States Patent
Øhrn et al.

(10) Patent No.: US 12,079,780 B2
(45) Date of Patent: Sep. 3, 2024

(54) INTELLIGENT PROCESSING AND PRESENTATION OF USER-CONNECTION DATA ON A COMPUTING DEVICE

(71) Applicant: MICROSOFT TECHNOLOGY LICENSING, LLC, Redmond, WA (US)

(72) Inventors: Aleksander Øhrn, Oslo (NO); Nir Netes, Oslo (NO); Kateryna Solonko, Oslo (NO); Ute Katja Schiehlen, Oslo (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 395 days.

(21) Appl. No.: 17/364,461

(22) Filed: Jun. 30, 2021

(65) Prior Publication Data
US 2023/0004943 A1 Jan. 5, 2023

(51) Int. Cl.
*G06Q 10/1093* (2023.01)
*G06Q 50/00* (2024.01)

(52) U.S. Cl.
CPC ......... *G06Q 10/1095* (2013.01); *G06Q 50/01* (2013.01)

(58) Field of Classification Search
CPC .. G06Q 10/1095; G06Q 10/109; G06Q 10/10; G06Q 50/01
See application file for complete search history.

(56) References Cited

U.S. PATENT DOCUMENTS

| 9,600,769 | B1 | 3/2017 | Buehling et al. |
| 2013/0144818 | A1* | 6/2013 | Jebara ................. G06Q 50/00 706/12 |
| 2014/0338001 | A1* | 11/2014 | Zhang ................ G06F 21/6218 726/28 |
| 2015/0106146 | A1* | 4/2015 | Higaki ............... G06Q 10/1095 705/7.19 |
| 2017/0308866 | A1 | 10/2017 | Dotan-cohen et al. |
| 2019/0171693 | A1 | 6/2019 | Dotan-cohen et al. |
| 2020/0374146 | A1* | 11/2020 | Chhabra ............. H04L 12/1822 |
| 2021/0097339 | A1* | 4/2021 | Agrawal ................ G06F 17/18 |

OTHER PUBLICATIONS

"International Search Report and Written Opinion Issued in PCT Patent Application No. PCT/US22/031683", Mailed Date: Sep. 13, 2022, 17 Pages.

* cited by examiner

*Primary Examiner* — Jay A Morrison
(74) *Attorney, Agent, or Firm* — Holzer Patel Drennan

(57) ABSTRACT

Technology is disclosed for controlling the processing and presentation of user-connection data on computing devices to provide improved electronic communications applications and user computing experiences. User-connection data may be programmatically determined or inferred from the user data for a plurality of users. The user-connection data may be assembled into a graph data structure, which may be further processed to determine optimal paths connecting users and to derive information insights. Aspects of information insights may be presented to a user and/or consumed by a computing application or service to provide an improved user computing experience.

18 Claims, 10 Drawing Sheets

INTELLIGENT PROCESSING AND PRESENTATION OF USER-CONNECTION DATA ON A COMPUTING DEVICE

BACKGROUND

Personal computing devices, such as laptops, computers, and smartphones, now carry and display a great variety of information and are used in a variety of settings. In turn, a variety of people may be encountered through these computing devices. Using these personal computing devices, people spend significant time in meetings (and increasingly online meetings) and communicating with other people, including time collaborating or working on teams. In these meetings, collaborations, and communications, it can be helpful to have contextual information presented about the other users or the group, such as information about relationships connecting the users or the group. For example, when a user has a meeting with, communicates with, or wants to meet somebody the user does not know well, especially for the first time or the first few times, it would be useful to provide information about how the user relates to the other person or people encountered to help the user contextualize who the person is, how they might be connected to the user or a group of users, as well as provide timely event driven data for improved computing applications for electronic communication, meetings, and scheduling. Existing, conventional technology lacks the computing functionality to programmatically determine this data or to determine insights from the data that can be used to provide the improved computing applications and an improved user computing experience.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described in the present disclosure are directed towards technologies for improving electronic communications computing applications and user computing experiences on user computing devices (sometimes referred to herein as mobile devices or user devices). In particular, embodiments provide technology to programmatically determine user-connection data, such as user-to-user connections and relationship paths connecting two or more users. The user-connection data may be assembled into a graph data structure and/or used for the provisioning of new communication application functionality and for displaying aspects of the user-connection data on a user device based upon a context. Such technologies improve the user experience in any of a number of computer applications and platforms.

BRIEF DESCRIPTION OF THE DRAWINGS

Aspects of the disclosure are described in detail below with reference to the attached drawing figures, wherein.

DETAILED DESCRIPTION

Figure 1:
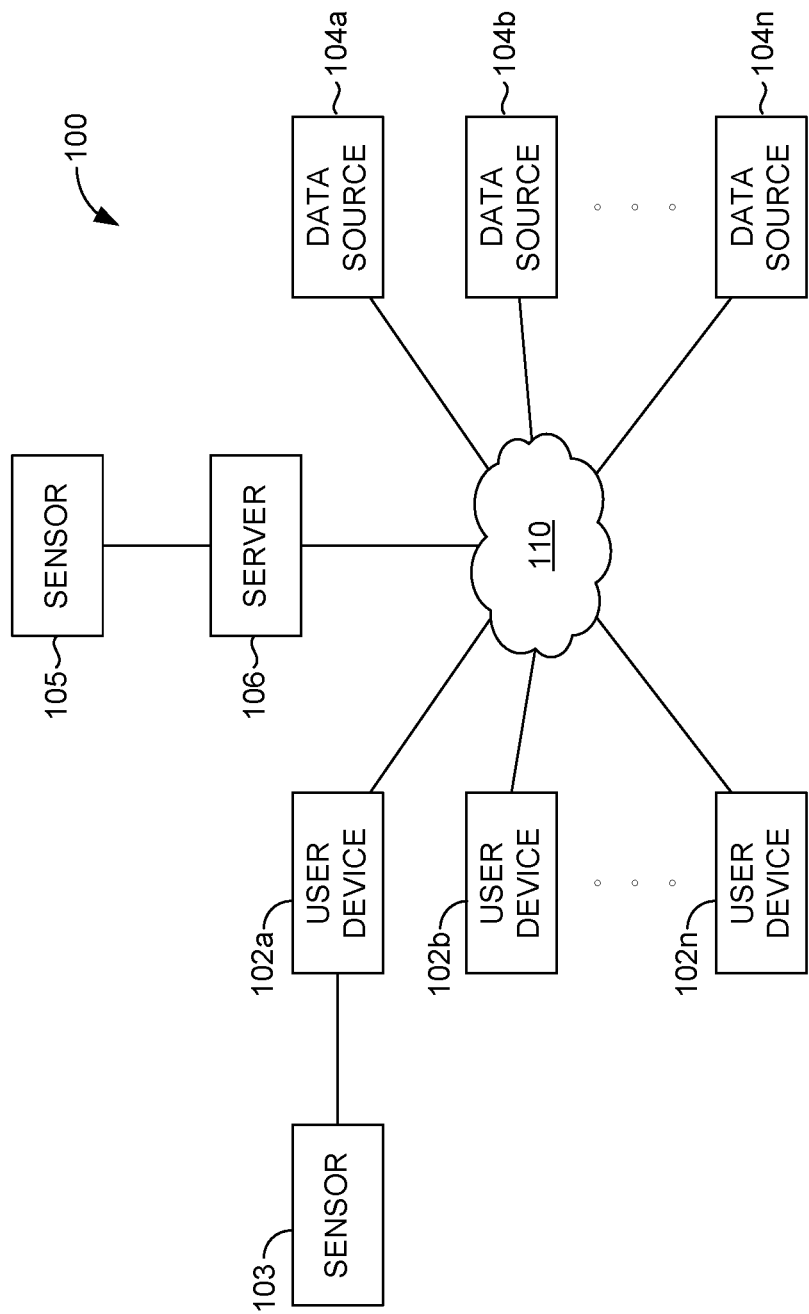
FIG. 1 is a block diagram of an example operating environment suitable for implementations of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-useable instructions stored on computer storage media. The methods may be provided by a stand-alone application, a service or hosted service (stand-alone or in combination with another hosted service), or a plug-in to another product, to name a few.

Aspects of the present disclosure relate to technology for improving electronic communication technology and enhanced computing services for a user, based on user-connection data. In particular, the solutions provided herein include technologies to programmatically determine connection data among users, such as user relationships, user-to-user connections, and optimal paths connecting two or more users, such as such as a pair of users, a first user and a group of other users, or two or more groups or users. The solutions further enable improved control over the processing and presentation or display of user-connection data on computing devices. As such, the user-connection data may be used for, among other beneficial computing applications, providing enhanced functionality for communication and collaborative computing applications, improved meeting scheduling computer services and electronic messaging applications, generating and presenting indicators of connections among users, and displaying aspects of the user-connection data on a user device based upon a context. Thus by determining and processing user-connection data differently than conventional technology, embodiments of this disclosure enable the provision of new functionality for electronic communications computing applications, as well as improved efficiency for electronic communication, enriched electronic communications, and improved computing experiences for users, such as personalized computing experiences, among other improvements described herein.

Accordingly and at a high level, a graph data structure that represents relationships among a plurality of users is accessed or created. As used herein, a graph data structure (or graph) is a non-linear data structure that comprises a plurality of nodes, each corresponding to a user, and one or more edges connecting a pair of nodes. Each edge indicates a relation between the two nodes, and thus reflects a relationship between the two people corresponding to the two nodes. One example graph is described in connection with FIG. 3.

In some embodiments, an existing graph may be augmented or enriched by gathering and incorporating additional user-connection data, as described herein. In some embodiments, a graph (or a plurality of graphs) may be generated from user data collected for a plurality of users represented by the graph. For example, in one embodiment, data related to a user is received. In some implementations, this user-related data may be collected, such as by monitoring or observing (with a consent of the user) user activity via one or more user devices of the user. Alternatively, or in addition, user-related data may be received by scraping or accessing sources of information about a user, which may include publicly available information for the user, social media account or activity, org charts and information about a user's employment, role, membership on a project team, office location, and other sources of information, such as those described herein. The collected user data may be converted into structured data, and/or one or more data features characterizing the user may be determined or extracted from the collected user data and stored in a data store associated with the user, such as a user profile. For example, the user data may be converted into a structured data schema or record, a feature vector, a set of feature-value pairs, or other data record.

A comparison may be performed of at least a portion of the user data, such as one or more data features, among a plurality of users to determine relationships or connections between pairs of users. For example, a feature vector or schema for two users may be compared to determine points of relation between the two users. In this way, it may be determined, by way of example, that two users work together, work in the same office location, report to the same manager, are both collaborators for a GitHub® repository, go to the same gym, or have another type of relationship with each other. Some types of relationships may be explicit, such as relationships indicating both users work in the same office location or are connected on a social media platform. Other types of relationships may be inferred, such as both users go to the same gym. In some embodiments, a set of explicit or pre-defined relationships may be compared to determine the relationships among two users. For instance, for every pair of users, compare their office work location, whether they have a "is manager of/reports to" relationship, whether they are connected on a social media platform or GitHub®, whether they are on the same project team, etc. In some embodiments, the relationships that are determined between a first and a second user may be different than the relationships determined between a third and a fourth user.

The connections determined between pairs of users among the plurality of users may be assembled into a graph data structure. For example, each user may correspond to a node, and an edge connecting any two nodes may represent a data relation between the two users corresponding to the two nodes. As the relationship types between any first pair of nodes (corresponding to users) may be different than the relationship types between any second pair of nodes, the assembled graph does not necessarily reflect homogeneous relationships, in some embodiments. Moreover, some pairs of nodes may share multiple edges, reflecting multiple different relationships between the two users corresponding to the pair of nodes. In particular, this is in contrast to conventional graph data structures having each edge represents the same kind of relationship or where nodes are connected by only one edge.

In some embodiments, at least some of the edges may be weighted. For example, an edge may be weighted based on the type of relationship represented by the edge and/or a degree or strength of the connection represented by the edge. For instance, suppose a first user both works with and reports to a second user. Then, a simplified graph representing a relation of these two users may comprise two nodes (representing the two users) with two edges connecting the two nodes: a first edge corresponding to a "works with" relation and a second edge corresponding to a "reports to" relation. According to one embodiment that uses edge weighting, the first edge may receive a weighting coefficient of 2 and the second edge a weighting of 1. In some embodiments using edge weighting, a weight may be predetermined and based on the particular relationship type; based on a user or administrator configured setting, such as user preference or feedback provided by a user; predetermined or dynamic based on other relationship types in the graph, in a path that includes the edge, or that shares a connection with an edge; and/or based on a context or use case for the user-connection data, for example. As further explained herein, edge weighting (and in some embodiments node weighting) may be used to determine an optimal path between two or more users.

In some embodiments, based on user-related activity, a context may be determined. The context may be used to determine or process a graph, a path, and/or assemble or format user-connection data, such as relationship data, for presentation to a user or consumption by a computing application. By way of example and without limitation, a context may comprise: information about two or more users for whom user-connection data is to be determined; a computing application context, such as participating in an online meeting; collaboration, or scheduling a meeting; a situation, such as the user attending a meeting; a criterion or constraint, such as requiring that a particular user (or users) be included or excluded in a path, or including or excluding a particular relationship type(s) in a path; or other contextual information that may be used for determining or processing a graph, a path, and/or assembling or formatting user-connection data. For instance, a context may comprise information indicating that a user is attending or scheduling a meeting with at least another user, sending a message to one or more other users, or viewing a Live Persona Card ("LPC") or other user profile of another user. Alternatively, or in addition, a user may explicitly provide a context, such as querying their relation with another user, or between two or more other users. As described above, the context may be used to interpret a relationship or a connection between two or more users, and/or for assembling or formatting user-connection data for presentation to a user or consumption by a computing application or service.

At least one optimal path connecting at least two users may be determined. In some embodiments, an optimal path is determined based at least in part on a context, which may comprise, in an embodiment, an indication of at least two users corresponding to end nodes of the path. In some embodiments, multiple paths between at least two users may be determined and from these paths, an optimal path may be determined. Further, in some instances or based on the context, multiple optimal paths may be determined such that each path is between a different pair of users. For example, where the context indicates a meeting, it may be useful to determine the connections (e.g., the paths) between each of the users in the meeting.

A path connecting two users in a graph comprises the edges and nodes that are traversed starting from a first end node (repressing one of the users) and ending at a second end node (representing the other user). In some embodiments, a least-cost path, which may comprise the optimal path, is determined between two users in the graph. The least-cost path may be determined based on the edge weights of edges traversed on a path between two users in the graph. For instance, by summing the edge weights as the edges are traversed along a path and determining the cumulative of edge weights between two end nodes. Where multiple paths exist between the two end nodes, the path having the lowest cumulative sum may be determined as an optimal path between the two end nodes. In some embodiments, a version of a Dijkstra's algorithm, A*, or similar graph traversal algorithm may be employed to determine an optimal path.

In some embodiments, the one or more optimal paths, or aspects of the paths or graph, may be processed to determine user-connection data such as an information item. In particular, an information item may comprise user-connection data regarding one or more optimal paths, a graph or subgraph, or related information, such as information about users, user data, or relationships, which may be determined based on user-connection data. In some embodiments, an information item may be may comprise an insight or may be formatted or assembled as an insight, or used to derive an insight. For example, an insight might comprise that a relationship exists between two users or further may comprise information about the type of relationship(s) that exist between the two users. For instance, the evaluation of the user data for a pair of users may indicate one or multiple connections, indicating a connectedness between the users. Based at least in part on the number and/or types of these relationships, and/or a confidence of any inferred relationships between the two users, an embodiment of the technology disclosed herein may programmatically infer a degree of closeness between the two users, which may be provided as an insight. Other examples of insights may comprise, by way of example and without limitation: a particular type of relationship that exists between a pair of users, such as a mentor-mentee relationship or a works with relationship, which may be determined or inferred based on the user data for the two users; a common relationship in a connection between you and another user, such as you and Bjorn both know Aleksander; a commonality among multiple paths (e.g., all of the meeting attendees know Aleksander); users who are particularly well connected (e.g., several particular people that appear in every path connecting pairs of users in a group); users who should be invited to a meeting, whose schedule should be prioritized in a meeting conflict, should be included as recipients on an email, or other insights and connection data that may be determined from processing the one or more optimal paths, such as described herein.

In some embodiments, the information item or other connection data, may be assembled and/or formatted for providing to a user or for use in a computing application or service. For instance, among other types of personalized or improved computing experiences provided, the information item or user-connection data may be presented as an ice breaker or people highlight on an LPC card or when the user hovers over another user; a visual contextualization may be presented showing relationships among meeting attendees or between a particular user and other meeting attendees; a meeting scheduling service may suggest inviting (or not inviting) a particular user based, at least in part, on user-connection data determined among one or more of the other users and the particular user. These and other examples of enhanced computing experiences are made possible by embodiments of the technologies described herein.

Overview of Technical Problems, Technical Solutions, and Technological Improvements The coalescence of telecommunications and personal computing technologies in the modern era has enabled, for the first time in human history, information on demand combined with a ubiquity of personal computing resources (including mobile personal computing devices and cloud-computing coupled with communication networks). As a result, it is increasingly common for users to rely on one or more mobile computing devices throughout the day for handling various tasks. It is also now possible to provide information to the user regarding connections or relationships among people that may be relevant to a particular task, location, communication, application use, or other contextual situation, referred to collectively as relationship data or connection data.

As described previously, people spend significant time in meetings and communicating with other people, including time collaborating or working on teams, and it can be helpful to have contextual information presented about the other users or the group, such as information about relationships connecting the users or the group. For example, when a user has a meeting with, communicates with, or wants to meet somebody the user does not know well, it would be useful to determine and provide information about how the user relates to the other person or people encountered to help the user contextualize who the person is, how they might be connected to the user or a group of users, as well as provide timely event driven data for improved computing applications for electronic communication, meetings, and scheduling. But the conventional technology can only provide this sort of information about a user, or information common to a group of users, based on a manually determined and specified relationship information, such as an org chat, or based on a direct relationship (sometimes referred to as a first-degree relationship) between users. For instance, an administrator may manually specify relationships between pairs of users indicating a "reports to" or "manager of" relationship. Similarly, an administrator may manually specify to show information about a pre-defined, first-relationship directly connecting the two users, such as you and the other user are connected on LinkedIn®. In one example, this information may be presented on a Live Persona Card ("LPC") or other user profile. Unfortunately, because this comparison is manually configured, it will be the same for all users (for example, always showing the same connecting relationship from a data field that is manually specified), and it may be presented every time (for example, it is static and does not change).

Additionally, this relationship information includes only a direct, first-degree connection between the user and one other user. For instance, in situations where any two users share a close relation to a third user, such as you and Bjorn both report to Kateryna, the user will not be provided this helpful contextual information that Kateryna connects you to Bjorn, unless it is manually specified and configured for all users. Even if that were the case, it quickly becomes overwhelming, if not impossible, for an administrator to manually determine and configure for presentation the connections between every possible pairing of users in situations where there is more than one person in between, such as you report to Kateryna, Kateryna works with Ute, and Ute manages Bjorn. Moreover, any manually specified relationship would only be an explicit relationship, as an administrator would have no way of determining implicit relationships among users.

Further, in the cases where an administrator manually determines relationship information, such as an org chat or even a based on a direct, first-degree relationship, such a process is inefficient, as a human has to manually assess a relationship for every user, and then configure or program the system accordingly. Further still, as the number of in-between people connecting a pair of users increases (e.g., Kateryna and Ute are in between you and Bjorn, in the previous example), then there are more likely to be multiple paths connecting the two users. Thus, determining which path between any two users as the best path becomes yet another technical challenge that burdens an administrator.

Accordingly, automated computing technology for programmatically determining, surfacing, and/or utilizing user-connection data as described herein, such as relationship(s) connecting any pair of users, a first user and a group of users, or two or more groups or users, and optimal paths of connection, can be beneficial for enabling improved computing applications and an improved user computing experience. Further, embodiments, as described herein, address a need that arises from a very large scale of operations created by software-based services that cannot be managed by humans. The actions/operations described herein are not a mere use of a computer, but address results of a system that is a direct consequence of software used as a service offered in conjunction with user communication through services hosted across a variety of platforms and devices. Further still, embodiments of this disclosure enable an improved user experience across a number of computer devices, applications, and platforms. Further still, embodiments, as described herein, cause certain, user-connection data shared among two or more users to be programmatically surfaced and presented without requiring computer tools and resources for a user to manually perform operations to produce this outcome. In this way, some embodiments, as described herein, reduce or eliminate a need for certain databases, data storage, and computer controls for enabling manually performed steps by an administrator, to search, identify and assess, and configure (e.g., by hard-coding) specific, static relationship information to be presented to users, thereby reducing the consumption of computing resources.

Additional Description of the Embodiments

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity.

Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user computing devices, such as user devices 102a and 102b through 102n; a number of data sources, such as data sources 104a and 104b through 104n; server 106; sensors 103a and 107; and network 110. It should be understood that environment 100 shown in FIG. 1 is an example of one suitable operating environment. Each of the components shown in FIG. 1 may be implemented via any type of computing device, such as computing device 700 described in connection to FIG. 7, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client user devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 7 herein. By way of example and not limitation, a user device may be embodied as a personal computer (PC), a laptop computer, a mobile or mobile device, a smartphone, a smart speaker, a tablet computer, a smart watch, a wearable computer, a personal digital assistant (PDA) device, a music player or an MP3 player, a global positioning system (GPS) or device, a video player, a handheld communications device, a gaming device or system, an entertainment system, a vehicle computer system, an embedded system controller, a camera, a remote control, an appliance, a consumer electronic device, a workstation, or any combination of these delineated devices, or any other suitable computer device.

Data sources 104*a* and 104*b* through 104*n* may comprise data sources and/or data systems, which are configured to make data available to any of the various constituents of operating environment 100, or system 200 described in connection to FIG. 2. For instance, in one embodiment, one or more data sources 104*a* through 104*n* provide (or make available for accessing) people data and person of interest data, which may include user-activity related data, to user-data collection component 210 of FIG. 2. Data sources 104*a* and 104*b* through 104*n* may be discrete from user devices 102*a* and 102*b* through 102*n* and server 106 or may be incorporated and/or integrated into at least one of those components. In one embodiment, one or more of data sources 104*a* through 104*n* comprise one or more sensors, which may be integrated into or associated with one or more of the user device(s) 102*a*, 102*b*, or 102*n* or server 106. Examples of sensed people data made available by data sources 104*a* through 104*n* are described further in connection to people-data collection component 210 of FIG. 2.

Figure 2:
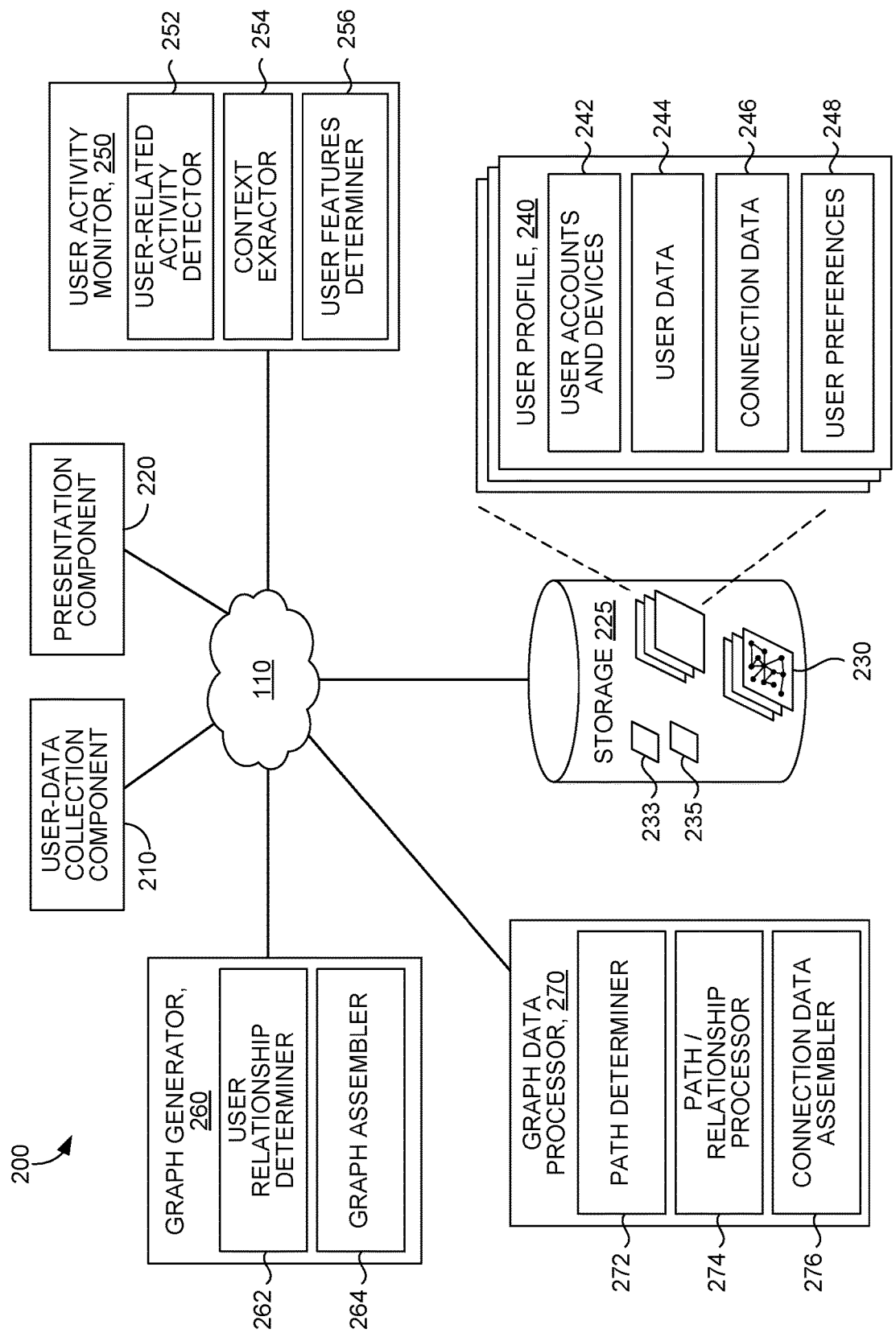
FIG. 2 is a diagram depicting an example computing architecture suitable for implementing aspects of the present disclosure.

Operating environment 100 can be utilized to implement one or more of the components of system 200, described in FIG. 2, including components for collecting people or user data; monitoring user activity to determining user data or user data features; user preferences, and/or similar categories of data regarding a people or a particular person of interest, context data, or related information to facilitate sharing context or to otherwise provide an improved user experience; graph generation and processing; and/or consuming or presenting user-connection data to users. Operating environment 100 also can be utilized for implementing aspects of methods 500 and 600 in FIGS. 5 and 6, respectively.

Referring now to FIG. 2, with FIG. 1, a block diagram is provided showing aspects of an example computing system architecture suitable for implementing an embodiment of this disclosure and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including user-data collection component 210, presentation component 220, user activity monitor 250, graph generator 260, graph data processor 270, and storage 225. User activity monitor 250 (including its subcomponents 252, 254, and 356), graph generator 260 (including its subcomponents 262 and 264\_, graph data processor 270 (including its subcomponents 272, 274, and 276), user-data collection component 210, and presentation component 220, may be embodied as a set of compiled computer instructions or functions, program modules, computer software services, or an arrangement of processes carried out on one or more computer systems, such as computing device 700 described in connection to FIG. 7, for example.

In one embodiment, the functions performed by components of system 200 are associated with one or more computer communications-related applications, services, or routines, such as an online meeting application, communications or collaboration application, LPC or user profile service, to determine or provide contextual information about relationships among two or more users, people highlights in association with a person, or otherwise to provide an enhanced computing experience for the user. In particular, such applications, services, or routines may operate on one or more user devices (such as user device 102*a*) or servers (such as server 106). Moreover, in some embodiments, these components of system 200 may be distributed across a network, including one or more servers (such as server 106) and/or client devices (such as user device 102*a*), in the cloud, or may reside on a user device, such as user device 102*a*. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some embodiments functionality of these components can be shared or distributed across other components.

Continuing with FIG. 2, user-data collection component 210 is generally configured to access or receive (and in some cases also identify) user data, which may include people data, with respect to both a user and one or more people of interest, from one or more data sources, such as data sources 104*a* and 104*b* through 104*n* of FIG. 1. In some embodiments, user-data collection component 210 may be employed to facilitate the accumulation of user data of a particular user (or in some cases, a plurality of users including crowdsourced data) for user activity monitor 250, or its subcomponents. The data may be received (or accessed), and optionally accumulated, reformatted, and/or combined, by user-data collection component 210 and stored in one or more data stores such as storage 225, where it may be available to other components of system 200. For example, the user data may be stored in or associated with a user profile 240, as described herein, such as in user data 244 or user profile 240. In some embodiments, any personally identifying data (i.e., people data that specifically identifies particular users) is either not uploaded or otherwise provided from the one or more data sources with people data, is not permanently stored, is de-identified, and/or is not made available to other components of system 200. In some embodiments, a user may opt into or out of services provided by the technologies described herein and/or select which user data and/or which sources of user data are to be captured and utilized by these technologies.

User data, generally, may be any information that is related to a person, or group of people, that informs a user about an aspect of that person or group of people, and may be received from a variety of sources and may be available in a variety of formats. By way of example and without limitation, user data may comprise contact information (e.g., email, instant message, phone, and may also specify a person's communication preferences); location information (e.g., a person's current location or location of a particular office where they work); presence; user-related activity, which may comprise activity relevant to the user (e.g., that the person of interest has an upcoming meeting with the user or recently emailed the user); task-related information (e.g., outstanding tasks that the user has with regard to the person of interest, or outstanding tasks that the person of interest has with respect to the user); information about the person of interest that they may choose to share (e.g., birthday, anniversary, etc.); information in common with the user (e.g., common project teams, work groups, backgrounds, education, interests or hobbies). Additional examples of user data are described herein.

In some embodiments, user data received via user-data collection component 210 may be obtained from a data source (such as data source 104(*a*) in FIG. 1, which may be a social networking site, a professional networking site, or other data source containing user or people data) or determined via one or more sensors (such as sensors 103*a* and 107 of FIG. 1), which may be on or associated with one or more user devices (such as user device 102*a*), servers (such as server 106), and/or other computing devices. As used herein, a sensor may include a function, routine, component, or combination thereof for sensing, detecting, or otherwise obtaining information such as user data from a data source 104*a*, and may be embodied as hardware, software, or both. By way of example and not limitation, user data may include data that is sensed or determined from one or more sensors (referred to herein as sensor data), such as location information of mobile device(s), properties or characteristics of the user device(s), user-activity information (for example: app usage; online activity; searches; voice data such as automatic speech recognition; activity logs; communications data including calls, texts, instant messages, and emails; website posts; other user data associated with communication events) including, user history, session logs, application data, contacts data, calendar and schedule data, notification data, social-network data, ecommerce activity, user-account(s) data (which may include data from user preferences or settings associated with a personalization-related application, a personal assistant application or service, an online service or cloud-based account such as Microsoft 365, an entertainment or streaming media account, a purchasing club or services), global positioning system (GPS) data, other user device data (which may include device settings, profiles, network-related information, payment or credit card usage data, purchase history data, other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor component), data derived based on other data (for example, location data that can be derived from Wi-Fi, Cellular network, or IP address data), and nearly any other source of data that may be sensed or determined as described herein.

User data, particularly in the form of context data or contextual information, can be received by user-data collection component 210 from one or more sensors and/or computing devices associated with a user. In some embodiments, user-data collection component 210, user activity monitor 250 (or one or more of its subcomponents), or other components of system 200 may determine interpretive data from received user data. Interpretive data corresponds to data utilized by the components or subcomponents of system 200 that comprises an interpretation from processing raw data, such as venue information interpreted from raw location information. Interpretive data can be used to provide context to user data, which can support determinations or inferences carried out by components of system 200. Moreover, it is contemplated that some embodiments of the disclosure use user data alone or in combination with interpretive data for carrying out the objectives of the subcomponents described herein. It is also contemplated that some user data may be processed, by the sensors or other subcomponents of user-data collection component 210 not shown, such as for interpretability by user-data collection component 210. However, embodiments described herein do not limit the user data to processed data and may include raw data or a combination thereof, as described above.

In some respects, user data may be provided in user-data streams or signals. A "user signal" can be a feed or stream of user data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. In some embodiments, user-data collection component 210 receives or accesses data continuously, periodically, as it becomes available, or as needed. In some embodiments, the user data, which may include people information/people data, received by user-data collection component 210 is stored in storage 225, such as in user data 244.

User activity monitor 250 is generally responsible for monitoring user activity for information that may be used for determining user data, and in some embodiments, a context. In particular, embodiments of user activity monitor 250 may determine user data associated with a particular user, which may include user-related activity data and context data, and may provide the determined user data as structured data, such as a set of data features, so that it may be used by other components of system 200. For instance, as further described herein, the user data may be used by graph generator 260 to be compared against similar user data for other users in order to determine user-connection data for generating a graph. Accordingly, in some embodiments, user data determined by user activity monitor 250, or its subcomponents, may be used to determine inferred relationships between a particular user and other users. The user data determined by user activity monitor 250, or its subcomponents, also may be stored in a user profile associated with a user, such as in user data 244 of user profile 240, where it may be accessible to other components of system 200.

In some embodiments, user activity monitor 250 may determine current or near-real-time user activity information and may also determine historical user activity information, which may be determined based on gathering observations of user activity over time, accessing user logs of past activity (such as browsing history, for example). For example, it may be determined that a particular user currently works with another user, or it may be determined that the particular user previously worked with the other user for a duration of time. Further, in some embodiments, user activity monitor 250 may determine user data and/or user-related activity data (which may include historical activity) from other users.

The user data determined by user activity monitor 250 (or its subcomponents) may include user-related activity information determined from one or multiple user devices associated with the user and/or from cloud-based services associated with the user (such as email, calendars, social media, or similar information sources), and may further include contextual information associated with the user activity or user data. For example, information about user activity on a particular device or cloud-based service may be used to determine a context associated with the user, which may be used for determining aspects of user-connection data for displaying to the user or providing to a computing application or service. In an embodiment, user activity monitor 250 comprises one or more applications or services that analyze information detected via one or more user devices used by the user and/or cloud-based services associated with the user, to determine activity information and/or contextual information. Information about user devices associated with a user may be determined from the user data made available via user-data collection component 210, and may be provided to user activity monitor 250 or other components of system 200. More specifically, in some implementations of user activity monitor 250, a user device may be identified by detecting and analyzing characteristics of the user device, such as device hardware, software such as operating system (OS), network-related characteristics, user accounts accessed via the device, and similar characteristics. For example, information about a user device may be determined using functionality of many operating systems to provide information about the hardware, OS version, network connection information, installed application, or the like.

Some embodiments of user activity monitor 250, or its subcomponents, may determine a device name or identification (device ID) for each device associated with a user. This information about the identified user devices associated with a user may be stored in a user profile associated with the user, such as in user accounts and devices 242 of user profile 240. In an embodiment, the user devices may be polled, interrogated, or otherwise analyzed to determine information about the devices. This information may be used for determining a label or identification of the device (e.g., a device ID) so that user interaction with the device may be recognized from user data by user activity monitor 250. In some embodiments, users may declare or register a device, such as by logging into an account via the device, installing an application on the device, connecting to an online service that interrogates the device, or otherwise providing information about the device to an application or service. In some embodiments, devices that sign into an account associated with the user, such as a Microsoft® account or MSA, email account, social network, or the like, are identified and determined to be associated with the user.

As shown in example system 200, user activity monitor 250 comprises a user-related activity detector 252, context extractor 254, and an user features determiner 256. In some embodiments, user activity monitor 250, one or more of its subcomponents, or other components of system 200, such as graph generator 260 or graph data processor 270, may determine interpretive data based on received user data, such as described previously. It is contemplated that embodiments of user activity monitor 250, its subcomponents, and other components of system 200 may use user data and/or user data in combination with interpretive data for carrying out the objectives of the subcomponents described herein. Additionally, although several examples of how user activity monitor 250 and its subcomponents may identify user-related activity information are described herein, many variations of user activity identification and user activity monitoring are possible in various embodiments of the disclosure.

User-related activity detector 252, in general, is responsible for determining (or identifying) a user action or user-activity event has occurred. Embodiments of user-related activity detector 252 may be used for determining current user activity or one or more historical user actions. Some embodiments of user-related activity detector 252 may monitor user data for activity-related features or variables corresponding to various user activity such as indications of communications with other users, locations or visits, information about meetings attended, applications launched or accessed, files accessed, websites navigated to, media played, or similar user activities. Additionally, some embodiments of user-related activity detector 252 may extract, from the user data, information about user-related activity, which may include current user activity, historical user activity, and/or related information such as context. Alternatively or in addition, in some embodiments, context extractor 254 determines and extracts context. Similarly, in some embodiments, user features determiner 256 extracts information about a user, such as user-related activity related features, based on an identification of the activity determined by user-related activity detector 252. Examples of extracted user-related activity information may include user location, app usage, online activity, searches, calls, usage duration, application data (e.g., emails, meeting invites, messages, posts, user status, notifications, etc.), or nearly any other data related to user interactions with the user device or user activity via a user device. For example, a user's location may be determined using GPS, indoor positioning (IPS), or similar communications functionality of a user device associated with a user.

Data determined from user-related activity detector 252 may be provided to other subcomponents of user activity monitor 250 or other components of system 200, or may be stored in a user profile associated with the user, such as in user data 244 of user profile 240. In some embodiments, user-related activity detector 252 or user activity monitor 250 (or its other subcomponents) performs conflation on the detected user data. For example, overlapping information may be merged and duplicated or redundant information eliminated.

In some embodiments, the user activity-related features may be interpreted to determine a user activity has occurred. For example, in some embodiments, user-related activity detector 252 employs user-activity event logic, which may include rules, conditions, associations, classification models, or other criteria, to identify user activity. For example, in one embodiment, user activity event logic may include comparing user activity criteria with the user data in order to determine that an activity event has occurred. Similarly, activity event logic may specify types of detected user-device interaction(s) that are associated with an activity event, such as navigating to a website, composing an email, or launching an app. In some embodiments, a series or sequence of user device interactions may be mapped to an activity event, such that the activity event may be detected upon determining that the user data indicates the series or sequence of user interactions has been carried out by the user.

In some embodiments, user activity detector 252 runs on or in association with each user device for a user. User activity detector 252 may include functionality that polls or analyzes aspects of the operating system to determine user activity related features (such as installed or running applications or file accesses and modifications, for example), network communications, and/or other user actions detectable via the user device including sequences of actions.

Context extractor 254 is generally responsible for determining a context associated with user-related activity or user data. As further described herein, a context (or context logic) may be used to determine or process a graph, or to assemble and/or format user-connection data for presentation to a user or consumption by a computing application. By way of example, a context may comprise information about a user's current activity, such as application usage, communication or interaction with other user(s) or interaction with user data for other users, information indicating types of user activity, for instance, that a user is attending or scheduling a meeting with at least another user, sending a message to one or more other users, or viewing a Live Persona Card ("LPC") or other user profile of another user. Alternatively, or in addition, a user may explicitly provide a context, such as a query about another user, or specifically querying their relation with another user, or between two or more other users. A context may include information about another user, such as a second user (or plurality of users) that the user is interacting with or accessing information about, as in where a user hovers their mouse over an indication of another user to view a portion of an LPC.

Some embodiments of context extractor 252 determine context related to a user action or activity event such as people entities identified in a user activity or related to the activity (e.g., recipients of a group email sent by the user), which may include nicknames used by the user (e.g., "mom" and "dad" referring to specific entities who may be identified in the user's contacts by their actual names), and may utilize a named-entity extraction model or named-entity recognition model. Context extractor 252 also may determine location- or venue-related information about a user's device, which may include information about other users or people present at the location. By way of example and not limitation, this may include context features such as location data; contextual information about the location; duration of a user activity; other information about the activity such as entities associated with the activity (e.g., venues, people, objects); information detected by sensor(s) on user devices associated with the user that is concurrent or substantially concurrent to the detected user activity; or any other data related to the user activity that is detectable that may be used for determining a context of the user-related activity.

In some embodiments, context extractor 254 comprises one or more applications or services that parse or analyze information detected via one or more user devices used by the user and/or cloud-based services associated with the user, to identify, extract, or otherwise determine a user-related or user-device-related context. Alternatively or in addition, some embodiments of context extractor 254 may monitor user data, such as that received by user-data collection component 210 or determined by user-related activity determiner 252, for information that may be used for determining a user context. In some embodiments, this information may comprise features (sometimes referred to herein as "variables") or other information regarding specific user-related activity and related contextual information. Some embodiments of context determiner 252 may determine, from the monitored user data, a user context associated with a particular user or user device, or a plurality of users and/or user devices. In some embodiments, a user context determined by context extractor 254 may be provided to other components of system 200 or stored in a user profile associated with a user, such as in user data 244 of user profile 240, where it may be accessed by other components of system 200.

User features determiner 256 is generally responsible for determining or extracting a set of one or more data features (or variables) characterizing the user and/or determining structured user data associated with the user. User features may be determined from information about user data received from user-data collection component 210 or from user-related activity data, which may include context data, determined by user activity monitor 250. In some embodiments, user features determiner 256 receives information from one or more of these other components of system 200 and processes the received information to determine a set of one or more features associated with the user. For example, user data processed by user features determiner 256 may comprise unstructured, semi-structured, or structured data about a user (or other users). In some embodiments, this received user data may be converted into a structured data schema or record, a feature vector, a set of data feature-value pairs, or other data record that is usable for performing a comparison against data of other users in order to determine user data relations. The user features or structured user data determined by user features determiner 256 may be provided to other components of system 200 or stored in a user profile associated with a user, such as in user data 244 of user profile 240, where it may be accessed by other components of system 200.

Examples of user features determined or extracted by user features determiner 256 may include, without limitation, data from information sources associated with the user, such as an org chart or employment data (e.g., who the user reports to, manages, works with, the user's role, project teams, or similar information), as well as social media or social collaboration information sources (e.g., the user's LinkedIn® connections, or GitHub® contributions or collaborations); location-related features, venue-related information associated with the location, or other location-related information; other users present at a venue or location; time-related features; current-user-related features, which may include information about the current or recent user of the user-device; user device-related features, such as device type (e.g., desktop, tablet, mobile phone, fitness tracker, heart rate monitor), hardware properties or profiles, OS or firmware properties, device IDs or model numbers, network-related information, position/motion/orientation-related information about the user device, network usage information, app usage on the device, user account(s) accessed or otherwise used (such as device account(s), OS level account(s), or online/cloud-services related account(s) activity, such as Microsoft® MSA account, online storage account(s), email, calendar, meetings, or social networking accounts); content-related features, such as meeting topics, presentations, or attendees, online activity (e.g., searches, browsed websites, purchases, social networking activity, communications sent or received including social media posts); or any other features that may be detected or sensed and used for determining the data characterizing a user.

Some embodiments of user features determiner 256, or user activity monitor 250 may determine interpretive or semantic data from user data, which may be used to determine user data features or other structured user data. For example, while a user-activity feature may indicate a location visited by the user, a semantic analysis may determine that the location is a gym or a coffee house or other data associated with detected user activity or user data. Thus, semantic analysis may determine additional user-activity related features or user data that is semantically related to other data and which may be used for further characterizing the user or for determining a context.

In particular, a semantic analysis may be performed on at least a portion of user data, to characterize aspects of the user data. For example, in some embodiments, user-related activity features may be classified or categorized (such as by type, time frame or location, work-related, home-related, themes, related entities, other user(s) (such as communication to or from another user) and/or relation of the other user to the user (e.g., family member, close friend, work acquaintance, boss, or the like), or other categories), or related features may be identified for use in determining a similarity or relational proximity to other user-related activity events. In some embodiments, a semantic analysis may utilize a semantic knowledge representation, such as a relational knowledge graph. A semantic analysis may also utilize semantic analysis logic, including rules, conditions, or associations to determine semantic information related to a user activity. For example, a user-related activity event comprising an email sent to someone who works with the user may be characterized as a work-related activity, which may be used to infer a relationship that the user works with the email recipient. A semantic analysis may also be used to further determine or characterize a context, such as determining that a location associated with user-related activity corresponds to a hub or venue of the user (such as the user's home, work, gym, or the like) based on frequency of user visits. For example, the user's home hub may be determined (using semantic analysis logic) to be the location where the user spends most of her time between 8 PM and 6 AM. Similarly, the semantic analysis may determine the time of day that corresponds to working hours, lunch time, commute time, or other similar categories.

Continuing with FIG. 2, graph generator 260 is generally responsible for generating a graph data structure of user-connection data for a plurality of users. As used herein, a graph is a non-linear data structure that comprises a plurality of nodes, with each node corresponding to a user, and one or more edges connecting each pair of nodes. An edge indicates a relation between the two nodes, and thus reflects a relationship between the two people corresponding to the two nodes. One example graph is described in connection with FIG. 3.

Some embodiments of graph generator 260 generate one graph or a plurality of graphs, where each graph may represent different type(s) of relationships, such as work relationships versus social relationships, or explicitly determined relationships versus inferred relationships; or each graph may represent different groups of users (e.g., one group may comprise employees of a company and another group may comprise a particular user's social circle). Some embodiments or graph generator 260 may augment or enrich an existing graph with additional user-connection data for users represented by the graph. Additionally, or alternatively, some embodiments of graph generator 260 may logically combine a plurality of graphs into a super-graph structure. For example, graph generator 260 may generate a first graph based on inferred relationships among users and logically merge the first graph with a second graph, which may be already determined and is based on user work relationships, as reflected in an org chart, or social media relationships, such as LinkedIn® connections. Embodiments of graph generator 260 may utilize graph-construction logic 233 to construct (or augment, or logically form) a graph, as further described herein. Graphs that are created by graph generator 260 may be stored as a graph 230 of storage 225, where they may be made accessible to other components of system 200, such as graph data processor 270.

Some embodiments of graph generator 260 generate (or augment) a graph using user data for a plurality of users, which may be received from a user-data collection component 210, from a user profile 240 associated with a user, or determined by a user activity monitor 250, or one of its subcomponents. In some embodiments, user data for a particular user may be determined by crawling and indexing content from information sources for the particular user, such as company or organizational information, social media activity, logs, other types of user data described herein, or any other data that the particular user has consented to sharing or making available for determining a relationship with other users. For example, some embodiments of graph generator 260 include functionality for scanning or crawling and indexing content related to a user. Similarly, content discovered via crawling may be converted into structured data, or data features may be extracted from the content and stored in a user profile associated with the particular user for which the content was identified.

As shown in example system 200, graph generator 260 comprises a user relationship determiner 262 and a graph assembler 264. User relationship determiner 262, in general, is responsible for determining a relationship between a pair of users, and in some embodiments further determine or infer the relationship type. In particular, embodiments of user relationship determiner 262 may determine a user-pair relationship between pairs of users. For instance, each user-pair relationship may identify two users and information indicating at least one relationship between the two users (e.g., user A shares a relationship with user B and the relationship(s) are: works with; or user C shares a relationship with user D, and the relationship(s) are: works with, reports to, and goes to the same gym).

Embodiments of user relationship determiner 262 may perform a comparison of at least a portion of the user data for a plurality of users, to determine a relationship and/or relationship type between pairs of users. In particular, user data features or a feature vector, schema, or other data for two users may be compared to determine data indicating a relationship between the two users. In some embodiments, a set of predetermined or user-defined relationship types are evaluated by the comparison, such as organizational relationships (e.g., reports to or is a manager of), social media connections, or office location, for example. In these embodiments, user data corresponding to the predefined relationship types may be compared to determine the relationships between pairs of users. For instance, for every pair of users, compare their office work location, whether they have a "is manager of/reports to" relationship, whether they are connected on a social media platform or GitHub®, whether they are on the same project team, or the like.

In some embodiments, relationships between two users are inferred based on the user data for each of the users. Moreover, in some of the embodiments where a user-to-user relationship is inferred, the comparison of user data may comprise performing a similarity or relation comparison operation or evaluating data values in a user schema or feature vector to determine equal or similar values. In some embodiments, graph construction logic 233 (described below) may be used, which may include computer instructions or rules for performing data comparisons to determine similarity or a relation indicating a connection. For example, two values for a data type (e.g., work location) may be compared, and if the values are the same or similar, then a relationship may be determined (e.g., the users both work in the same location). In some embodiments a similarity comparison may be performed based on a distance of feature values, and a similarity threshold employed so that two data features are determined to be similar, if their distance is less than the similarity threshold, for example. In these embodiments, the similarity threshold may be predefined, based on user settings or preferences, or based on the particular data being compared corresponding to a relationship type (e.g., work location). In some embodiments, a table or dictionary may be utilized to determine that specific data values for two users indicate a type of relationship. For example, if user data for a first user indicates that the user is a runner and user data for the second user indicates that the user is a jogger, then it may be determined that both users share a relationship of running (or jogging). Similarly, if user data for a first user indicates the first user is a fan of the Vålerenga Hockey team, and user data for a second user indicates the second user is a fan of the Seattle Kraken Hockey team, then it may be determined that both users share a relationship of liking hockey, or more generally a relationship as sports fans. In some embodiments, a hierarchical relationship similarity such as a genus-species may be determined from the comparison. For example, if the user data for a first user indicates they like baseball and the user data for a second user indicates they like basketball, then a comparison may determine that both users share a relationship for liking sports, because baseball and basketball are species within a genus of sports. In some embodiments a table-lookup, dictionary, or index may be used to determine a genus-species relationship.

In this way, embodiments of user relationship determiner 262 (or more generally of graph generator 260) can determine, by way of example, that two users work together, work in the same office location, report to the same manager, are both collaborators for a GitHub® repository, go to the same gym, or have another type of relationship with each other. Moreover, as described herein, some types of relationships may be explicit, such as relationships indicating both users work in the same office location or are connected on a social media platform. Other types of relationships may be inferred, such as both users go to the same gym.

Further, in some embodiments, a corresponding confidence or probability of the relationship between the two users also may be determined by user relationship determiner 262. For instance, in the case of an explicit relationship type, such as a social media connection, the confidence may 0 or 1 (or the relationship type may be binary), because the two users either are or are not connected on social media. For inferred relationships, a confidence may indicate the strength of the inference. For example, where user data indicates that two users work in the same office, are on the same project team, and frequently exchange messages about work with each other, then an inferred relationship that the two users work together may have a high confidence value. On the other hand, where user data only indicates that two users have the same office location, but other user data indicates they different roles in an organization, then a relationship inference that the two users work together may have a much lower confidence. In some embodiments, only relationships (whether inferred or explicit) having a confidence satisfying a given relationship confidence threshold may be used for constructing a graph; for example, greater than 0.8 or more likely than not (e.g., greater than 0.5). In some embodiments, the relationship confidence threshold (or whether a relationship is included in the graph or used by graph data processor 270) varies by the particular relationship type, and/or a context. For example, where a context indicates that a user wants to see how they are connected to another user, then relationship types (or inferred relationships) with a lower confidence may be acceptable, but where a context indicates a user is desiring to make an introduction or determining a well-connected person in a group of people, such as an influential person to be invited to a meeting, then a higher relationship confidence threshold may be used so that only relationships that are more certain are used. In some embodiments using a relationship confidence threshold, the threshold may be specified as a user configuration in user preferences 248.

Figure 3:
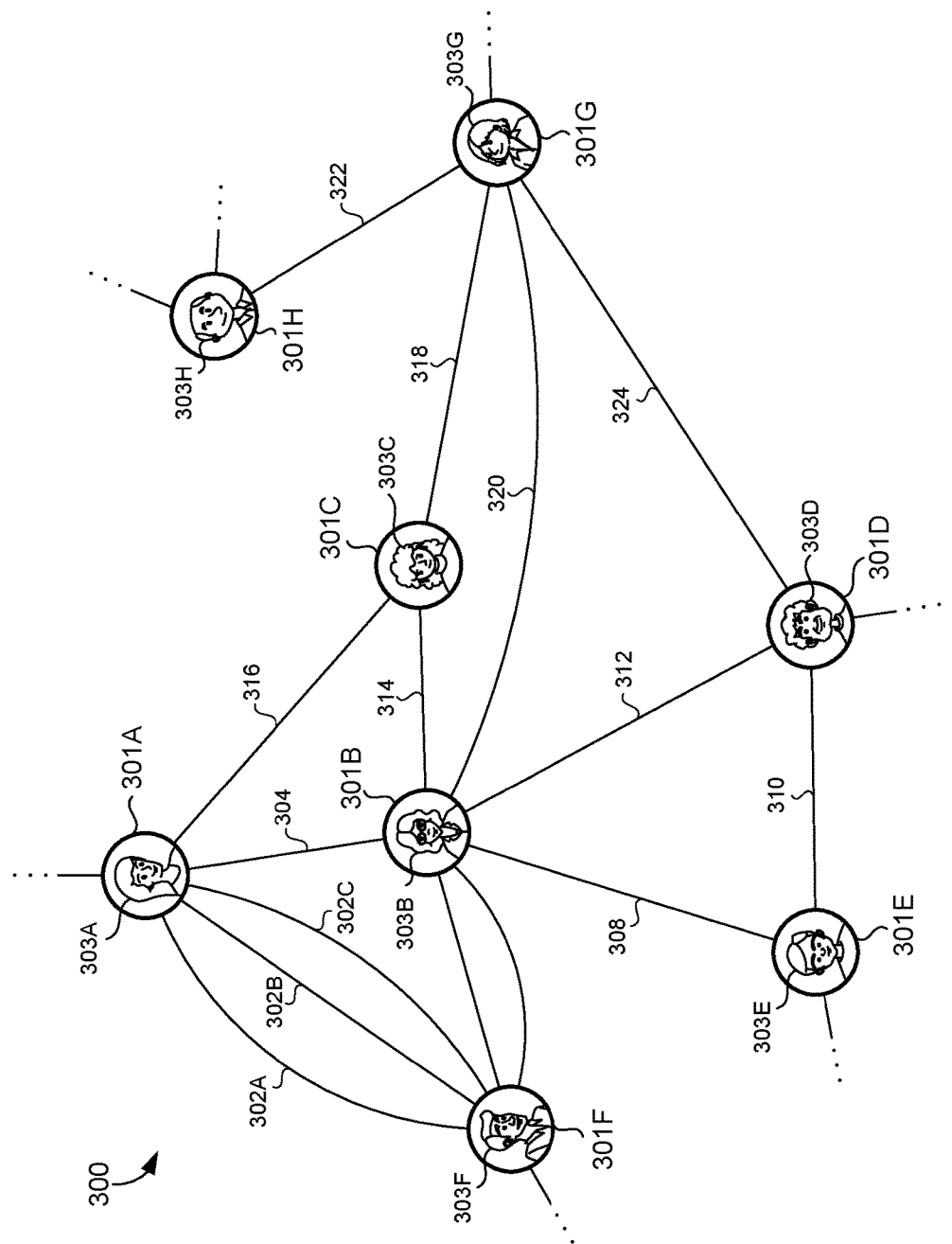
FIG. 3 illustratively depicts aspects of an example graph data structure of connection data for a group of users, in accordance with an embodiment of the present disclosure.

Graph assembler 264, in general, is responsible for assembling user-pair relationships determined by user relationship determiner 262 into a graph. One example of a graph 300 is illustratively depicted in FIG. 3. With reference to FIG. 3, and continuing reference to FIG. 2, graph assembler 264 (or more generally, graph generator 260) may generate (or augment) a graph such as graph 300 in FIG. 3. Example graph 300 includes a plurality of nodes 301A, 301B, 301C, 301D, 301E, 301F, 301G and 301H, and edges (e.g., edges 302A, 302B, 302C, and 304), with each edge connecting a pair of the nodes. Embodiments of graph assembler 264 may assemble the user-pair relationships into a graph such that each user corresponds to a node, and an edge connecting any two nodes represents a relationship between the two users corresponding to the two nodes. For example two users 303A and 303C corresponding to nodes 301A and 301C, respectively, share a relationship as indicated by edge 316. In some embodiments, graph assembler 264 assigns or designates each user, in a plurality of users to be represented in the graph 300, as a node (e.g., users 303A, 303B, 303C, 303D, 303E, 303F, 303G, and 303H are represented at nodes 301A, 301B, 301C, 301D, 301E, 301F, 301G and 301H, respectively). Then, the relationships between pairs of users, from the user-pair relationships, are used to form edges connecting the nodes, so that an edge connecting two nodes corresponds to a relationship indicated by the user-pair relationship. Thus in some embodiments, an edge may be considered to be annotated as indicting a relationship type. As the relationship types between any first pair of nodes (corresponding to users) may be different than the relationship types between any second pair of nodes, a graph, such as graph 300, assembled by graph assembler 264 does not necessarily reflect homogeneous relationships in the graph edges, in some embodiments. For example, a relationship type represented by edge 302A is different than a relationship type represented by edge 302B and may be different than a relationship type represented by edge 316. Moreover, some pairs of nodes may share multiple edges, such as nodes 301A and 301F sharing edges 302A-C, reflecting multiple different relationships between the two users corresponding to the pair of nodes 301A and 301F. Accordingly, graphs assembled by graph assembler 264 (or more generally generated or augmented by graph generator 260) are different than conventional graph data structures where each edge represents the same kind of relationship (e.g., homogeneous) or where any pair of nodes are connected only by one edge.

Some embodiments of graph assembler 264 utilize graph construction logic 233 (further described below) to assemble a graph, such as graph 300. Graph assembler 264 may provide assembled graph 300 to graph data processor 270 or store the assembled graph 300 as a graph 230 in storage 225, where it may be accessible to other components of system 200.

In some embodiments, graph assembler 264 may determine or assign an edge weight for at least some of the edges in a graph. As explained herein, edge weighting, and in some embodiments node weighting, may be used by graph data processor 270 to determine an optimal or least-cost path between two end nodes. An edge weight may comprise a coefficient, multiplier, or number associated with an edge that may reflect a bias or weighting of the particular relationship type or the relationship closeness of the users corresponding to the nodes that share the weighted edge. For instance, suppose edges 308 and 310 each represent a "reports to" relationship, and edge 312 represents an inferred, "works with" relationship. According to one embodiment that uses edge weighting, edges 308 and 310 may have a weight of 1, and edge 312 may have a weight of 4. Thus, as further described in connection with graph data processor 270, an optimal or least-cost path between nodes 301B and 301D would be the path that travels from node 301B to node 301E to node 301D, which has a cost of 2 (each edge is weighted at 1). Although a direct path exists between node 301B and node 301D (as indicated by edge 312), the cost for this path is 4, and thus it is not the least-cost path. Accordingly, this may indicate that a stronger or more reliable chain of relationships among users exists in the least cost path (301B-301E-301D) than in the direct path.

In some embodiments using edge weighting, a weight may be pre-determined and based on the particular relationship type; based on a user or administrator configured setting, such as user preference or feedback provided by a user; based on other relationship types in the graph, in a path that includes the edge, or that shares a connection with an edge; may be dynamic, and/or based on a context or use case for the user-connection data, for example. For example, an edge may be weighted based on the type of relationship represented by the edge and/or a degree or strength of the connection represented by the edge, which may be based on a confidence associated with the relationship or based on the particular user data that supported the determination or inference of a relationship. In some embodiments, an edge weight may be dynamic or based on a context; for instance, a user may specify that certain types of relationships types are preferred or want to see a relationship path of users having a certain type of relationship.

In some embodiments, where multiple edges connect a pair of nodes, such as nodes 301A and 301F, graph assembler 264 may determine a composite edge and/or a corresponding combined edge weight reflecting the closeness of relation between the users corresponding to the nodes sharing the multiple edges or composite edge. Some embodiments of graph construction logic 233 may include rules or computer instructions for determining a weight for a composite edge and/or a corresponding combined edge weight. For example, suppose edges 302A, 302B, and 302C represented relationships: works with, reports to, goes to the same gym, respectively. Although each of these edges may have a weight, because there are three edges connecting nodes, this may indicate greater degrees of connection or closeness between the two users represented by the nodes. Accordingly, in some embodiments of graph assembler 264 that determine a composite edge or combined edge weight, the resulting weight may be lower than the individual weights of any one of the edges. For example, one rule of graph construction logic 233 may specify to determine a combined weighting as follows:

$$\text{Combined Edge Weight} = \frac{1}{\left(\frac{1}{W_{edge1}} + \frac{1}{W_{edge2}} \cdots \frac{1}{W_{edge\,n}}\right)}$$

where Wedge 1=the edge weight of the first parallel edge.

In some embodiments, graph assembler 264 may assign a weight to nodes. For example, a context may indicate determining a path between two end users that avoids (or preferably avoids) a particular user or a path that includes a particular user. Accordingly, by assigning a weight to the node corresponding to that user, the node may be more likely to be included or excluded in an optimal path. For example, by assigning the node a low weight (e.g., 0), and all other nodes a higher weight (e.g., 1), then a least-cost path is more likely to include the low-weighted node. In another example, a node weight may be determined based on a PageRank-type algorithm or a similar determination of the degree to which a particular node is connected to other nodes in a graph. Thus, for example, a well-connected node may receive a lower weight than a less-connected node, which may cause the well-connected node to be more likely included in an optimal path.

Some embodiments of graph generator 260, or its subcomponents, may utilize graph-construction logic 233 for generating a graph. Graph-construction logic 233 may comprise computer instructions including rules, conditions, associations, classification models, or other criteria for determining user-pair relationships, assembling user-pair relationships into a graph, or augmenting or generating a graph. In some embodiments, graph-construction logic 233 includes logic for performing comparison of user data to determine similarities indicating relationships and/or specifying explicit or predefined user data to evaluate for determining a relationship between pairs of users. For example, graph-construction logic 233 may include a set of rules for comparing feature values for identical data feature types, and determining a level of similarity feature values of similar feature types. For instance, some embodiments may utilize classification models such as statistical clustering (e.g., k-means or nearest neighbor) or a proximity of features to each other on a semantic knowledge graph, neural network, or other classification techniques to determine similarity. Some embodiments of graph-construction logic 233 include logic for determining or assigning edge weighting or node weighting, or for incorporating a context into an edge weight or note weight, such as setting higher weight for a node corresponding to a person that a user wants to exclude in an optimal path. Accordingly, graph-construction logic 233 may take different forms. For example, the graph-construction logic 233 may comprise a set of rules (which may include static or predefined rules or may be set based on settings or preferences in a user profile associated with the user), Boolean logic, decision trees (e.g., random forest, gradient boosted trees, or similar decision algorithms), conditions, or other logic, a deterministic or probabilistic classifier, fuzzy logic, neural network, finite state machine, support vector machine, logistic regression, clustering, or machine learning techniques, similar statistical classification processes, or combinations of these.

Continuing with FIG. 2, graph data processor 270 is generally responsible for processing a graph to determine an insight, such as an information item (or more generally connection data) about an aspect of at least one optimal path between two users or connecting a plurality of users. In particular, graph data processor 270 may process a graph, aspects of the graph, or information determined from a graph, such as paths, in order to determine user-connection data such as an information item. Thus an information item may comprise user-connection data regarding one or more paths, such as an optimal path, a graph or subgraph, or related information, such as information about users, user data, or relationships, which may be determined based on user-connection data. In some embodiments, an information item may comprise an insight or may be formatted or assembled as an insight, or used to derive an insight. For example, an insight may indicate user-connection data such as people relationships connecting two or more users.

Embodiments of graph data processor 270 may receive a graph or data from a graph, which may be received from graph generator 260 or from graph 230 in storage 225, and process the graph according to a context, such as a constraint, consideration, or indication of at least one user in the graph. Embodiments of graph data processor 270 may further assemble or format the connection data (e.g., an insight) for consumption by a computing application or service, and/or for presentation to a user. In some embodiments, the assembly or formatting also may be determined according to a context. The assembled or formatted connection data may be provided to presentation component 220 for presentation to a user or provided for consumption to a computing application or service to enable an enhanced computing experience for a user.

As shown in example system 200, graph data processor 270 comprises a path determiner 272, a path/relationship processor 274, and a connection data assembler 276. With continuing reference to FIG. 2 and reference to FIG. 3, path determiner 272, in general, is responsible for determining one or more paths in a graph, such as graph 230 or graph 300 (FIG. 3). In particular, embodiments of path determiner 272 process a graph 230 to determine at least one path, which may comprise an optimal or least-cost path, between two graph nodes, each node corresponding to a user. More specifically, a path connecting two users in a graph comprises the edges and nodes that are traversed starting from a first end node (repressing one of the users) and ending at a second end node (representing the other user). Thus, any path between two connected users in a graph may be determined by traversing the graph, starting at a first end node, corresponding to one of the users, and moving along edges and nodes until arriving at the second end node, corresponding to the second user. For example, with reference to graph 300 in FIG. 3, a first path between two users 303A and 303H corresponding to nodes 301A and 301H, respectively, may be determined by path determiner 272 as: path(301A,301H)=[(node 301A)-edge 316-(node 301C)-edge 318-(node 301G)-edge 322-(node 301H)]. In this path, nodes 301A and 301H may be referred to as end nodes of the path, because this first path connects these two nodes 301A and 301H. In some graphs, there may be multiple paths connecting two end nodes, (and thus correspondingly connecting two users). For example a second path between the two users 303A and 303H corresponding to nodes 301A and 301H, respectively, may be determined by path determiner 272 as: path(301A, 301H)=[(node 301A)-edge 304-(node 301B)-edge 314-(node 301C)-edge 318-(node 301G)-edge 322-(node 301H)]. A third path between the two users 303A and 303H corresponding to nodes 301A and 301H, respectively, may be determined by path determiner 272 as: path(301A, 301H)=[(node 301A)-edge 304-(node 301B)-edge 312-(node 301D)-edge 324-(node 301G)-edge 322-(node 301H)]. Still another, fourth path between the two users 303A and 303H corresponding to nodes 301A and 301H, respectively, may be determined by path determiner 272 as: path(301A, 301H)=[(node 301A)-edge 304-(node 301B)-edge 320-(node 301G)-edge 322-(node 301H)].

As described herein, an edge connecting any two nodes represents a relationship between the two users corresponding to the two nodes. For example the two users 303A and 303C corresponding to nodes 301A and 301C, respectively, share a relationship as indicated by edge 316. As further described herein, in some instances, an edge connecting two nodes corresponds to a relationship indicated by the user-pair relationship that may have been determined by user relationship determiner 262. Accordingly, a path having two nodes connected by at least one edge represents a relationship or connection between the two people corresponding to the two nodes connected by an edge, where the relationship is represented by the edge(s). A path comprising at least three or more nodes connected by at least one edge between each pair of contiguous nodes in the path thus represents a chain of relationships, where each relationship between two users in the path is represented by an edge connecting a pair of contiguous nodes (corresponding to the two users sharing the relationship. For example, in the first path above where path(301A,301H)=[(node 301A)-edge 316-(node 301C)-edge 318-(node 301G)-edge 322-(node 301H)], this first path represents a chain of relationships between people (users 303A, 303C, 303G, and 303H) corresponding to each of the nodes 301A, 301C, 301G, and 301H. For instance, if each of edges 316 and 322 represent a "works with" relationship, and edge 318 represents a "reports to" relationship, then the chain of relationships for the users (303A, 303C, 303G, and 303H) in this first path would be determined as: user 303A works with user 303C who reports to user 303G, who works with user 303H.

Embodiments of path determiner 272 may determine at least one optimal path between two end nodes of a graph. An optimal path may be determined based on the weights of edges and/or nodes traversed on a path between two end nodes in the graph. In particular a path cost or value may be determined for a path by summing the edge weights as the edges are traversed (and/or, in some embodiments summing the node weights, as nodes are traversed) along the path and determining the cumulative sum of weights between two end nodes. An optimal path may comprise the least-cost path (or the path having the lowest cumulative sum of weights) between the two end nodes. In some embodiments, path determiner 272 may determine multiple paths between at least two users such as in the previous examples, and from these paths, may determine an optimal path, such as a least-cost path. Alternatively or in addition, some embodiments determine an optimal path as a path is determined, such as by evaluating, at a current node, a cumulative sum of the weights associated with each edges and/or nodes that connect the current node to a destination node, and selecting the edge or next node with the lowest weight(s).

In some embodiments, where multiple paths exist between two end nodes, path determiner 272 may determine the path having the least cost (for example, the lowest cumulative sum) as an optimal path between the two end nodes. For instance, consider the example described above in connection with graph assembler 264, where edges 308 and 310 of FIG. 3 have edge weights of 1, and edge 312 has a weight of 4. Suppose all other edges in graph 300 have a weight of 1. Accordingly, among the paths that connect end nodes 301B and 301D, path determiner 272 may determine an optimal or least-cost path to be: best-path(301B, 301D) =[(node 301B)-edge 308-(node 301E)-edge 310-(node 301D)], or in other words, the path that travels from node 301B to node 301E to node 301D, which has a cost of 2 (each edge is weighted at 1). In contrast, although a direct path exists between node 301B and node 301D (as indicated by edge 312), the cost for this path is 4 because edge 312 has a weight of 4, and thus it is not the optimal path.

Some embodiments of path determiner 272 may utilize path logic 235 to determine a path and/or an optimal path. Path logic 235 may comprise computer instructions including rules, conditions, associations, classification models, or other criteria for determining a path or an optimal path, such as a least-cost path in a graph. Some embodiments of path logic 235 may further comprise logic for determining a path (or optimal path) based on a context, such as a constraint, as described herein. Path logic 235 may take different forms depending on the particular graph and/or properties of the graph (e.g., relationship types, weightings of nodes or edges, number of edges connecting nodes) and/or based on a context, and may comprise a set of rules, such as Boolean logic, various decision trees (e.g., random forest, gradient boosted trees, or similar decision algorithms), conditions, or other logic, fuzzy logic, neural network, finite state machine, support vector machine, or machine-learning techniques, or combinations of these to determine a path or optimal path.

In some embodiments, path logic 235 comprises a version of Dijkstra's algorithm, A* algorithm, or similar algorithm for graph traversal and used for finding a shortest path between two nodes in a graph. In some embodiments, path logic 235 comprises a modified Dijkstra's algorithm (or similar algorithm) that is modified according to the embodiments described herein such as by utilizing edge or node weights instead of distance, between two given nodes (e.g., end nodes), which may be determined based on a context. In some embodiments, of path logic 235, the Dijkstra's algorithm (or similar algorithm) may be further modified to account for multiple edges between two nodes. For example, where multiple edges between two nodes are encountered, one embodiment of path logic 235 may specify to use the lowest weighted edge. Alternatively, another embodiment of path logic 235 may specify to determine a combined edge weighting, such as described herein. Similarly, where two different paths between the same end nodes are determined as optimal paths (e.g., both paths have the same cumulative sum of weights), then some embodiments of path logic 235 may provide both optimal paths, or provide the union of user-connection data represented in both paths. Some embodiments of path logic 235 may include instructions for determining one optimal path from two (or more) paths having the same cumulative sum of weights. For example, in one embodiment, a PageRank-type algorithm may determine the connectedness of nodes in each path, which may be reflected as a node weights, and determine the least-cost path that considers node weights. One embodiment may determine the optimal path as the one with the fewest number of nodes, and thus the fewest number of users. For example, for two optimal paths between end points having the same least-cost determination, select the one with the fewest number of nodes. The path with fewer nodes reflects fewer degrees of separation between users corresponding to the end nodes of the path.

In some embodiments, path determiner 272 may determine, or path logic 235 may comprise logic for, determining an optimal path based at least on a context. For example, a context may comprise an at least two users corresponding to end nodes of the path, or an indication of one other person and the particular user for which the path is being determined. In some embodiments, a context may comprise a computing application context, such a participating in an online meeting or chat session, scheduling a meeting, or sending an email; a criterion or constraint, such as requesting that a particular user (or users) be included or excluded in a path, or including or excluding particular relationship type(s) in a path; or other contexts or contextual information, such as described herein, that may be used by path determiner 272 or specified in path logic 235 for determining path(s), optimal path(s), or aspects of a path, such as relationship data or other user-connection data. In some instances, which may be based on a context, multiple optimal paths may be determined such that each path is between a different pair of users. For example, where a context indicates a meeting of a plurality of users, it may be useful to determine the connections (e.g., the paths) between each of the users in the meeting. One example of this application is illustratively depicted in FIG. 4D, and further described in connection with FIG. 4D.

Continuing with example system 200 and graph data processor 270, path/relationship processor 274, in general, is responsible for processing a graph, such as graph 230 or graph 300 (FIG. 3), or an aspect of a graph, such as an optimal path, to determine an insight, which may comprise an information item (or more generally connection data) regarding the graph or path. The output of path/relationship processor 274 may be provided to connection data assembler 276 where it may be assembled, formatted, or further processed for presentation to a user and/or consumption by a computing application or service. Embodiments of path/relationship processor 274 may process a graph or path according to a context. For example, a context indicating another user, or a first user's connection to that other user, may comprise processing a graph by path/relationship processor 274 to determine an optimal path between the first user and the other user, and determining information about the path, such as the chain or relationships of people in the path, or about a particular person in the path. For instance, if the optimal path between the first user and the other user includes only three nodes (corresponding to three people), then the first user and the other user both have a relationship with a common person, who corresponds to the in-between node. Hence the first user and the other user may both know (or more specifically, have a relationship, which is represented by the edges) with the user corresponding to the in-between node. Thus if the context indicates that you are the first user and Bjorn is the other user, then it may be determined that you and Bjorn both know Aleksander, who might be the user corresponding to the in-between node. Similarly, path/relationship processor 274 may determine that all paths between the first user and the other user include a particular node, regardless of the number of nodes in the paths. For instance, all paths between you and Aleksander go through Kateryna. Thus Kateryna represents a commonality in the connection between you and Aleksander, and an insight indicating this may be determined and provided by path/relationship processor 274.

Another example of an insight that may be determined by path/relationship processor 274 may comprise that a relationship exists between two users or further comprises information about the type of relationship(s) that exist between the two users. For instance, the evaluation of the user data for a pair of users may indicate one or multiple connections, indicating a connectedness between the users. Based at least in part on the number and/or types of these relationships, and/or a confidence of any inferred relationships between the two users, path/relationship processor 274 may infer a degree of closeness between the two users, which may be provided as an insight. Similarly, path/relationship processor 274 may determine or infer a particular type of the relationship based on the user data for the two users, such as a mentor-mentee relationship or a works with relationship, for instance.

In other examples, where a context indicates a meeting with you (or a first user) and a group of attendees, or the context indicates any group of people, then path/relationship processor 274 may process a graph or optimal paths between pairs of the meeting attendees (or the group of people), which may be determined by path determiner 272, to determine an insight such as, by way of example, a commonality among the multiple paths (e.g., all of the meeting attendees know Aleksander, who also may be an attendee, or who is not an attendee but is known by all of the attendees). In particular, it may be helpful to know who the well-connected attendees are, as those individuals may function as influencers among the group during the meeting. Similarly, an insight may comprise information about other people who are particularly well connected to the group of attendees, such as people that appear most frequently in the paths connecting pairs of users in the group. Another insight may comprise an information item about one or more relationships of the attendees, such as all of the attendees previously worked together or go to the same gym; or an insight that one or some of the attendees do not have a close connection (such as 3 people removed) to other attendees, and therefore it may be helpful to introduce that attendee (or those attendees) to the rest of the group.

In yet another example where a context indicates a particular user is scheduling a meeting with a group of people, and not all of the people are available for a meeting time, path/relationship processor 274 may process a graph of the potential meeting attendees to determine an insight regarding the connectedness of meeting attendees with other meeting attendees. For example, path/relationship processor 274 may determine those potential meeting attendees who are the most connected with other meeting attendees, and thus who may act like social hubs among the pool of potential attendees. Using this information, a computerized meeting scheduler service may programmatically prioritize scheduling a meeting to include those individuals are the most connected (e.g., who are the social hubs), as those individuals may be more likely to relay important information to the attendees who could not attend the meeting. Similarly, if a meeting venue has a capacity, then in-person attendance may be prioritized for those individuals who are the most connected.

In still another example where a context indicates a particular user is messaging a group of recipients, path/relationship processor 274 may process a graph of the group of recipients to determine an insight indicating one or more other people who are well connected to the group of recipients. Using this information, a communications computer application, such as an email application, might suggest that the particular user consider including as recipients those individuals (or individual) who are well-connected. Similarly, where path/relationship processor 274 determines that a group of people has strong or high connectedness to each other, based on a graph of the people, and an email that is being composed includes as recipients all but one of the group, then some embodiments may infer that the email author may intend to be emailing the group and inadvertently omitted one of the group members. Accordingly, the email computer application might suggest that the omitted group member be included as a recipient. Still further, some embodiments of path/relationship processor 274 may infer a group of connected people, such as people who work together or share other relationships, based on processing a graph. In some instances, such as where the connectedness of the inferred group is strong (e.g., such as where there is high confidence of inferred relationships in the group—represented by edges in a graph of the group), an information item about the group may be surfaced to a user, or may be provided for consumption by a computing application or service. For example, an email or communications application might programmatically infer a distribution list or group, or may generate a tag or label for organizing email from the group, just as a user might manually configure for their email program.

In some aspects, path/relationship processor 274 may determine insights about the connectedness between a first user and a group. For example, path/relationship processor 274, which may operate in conjunction with path determiner 272, may determine an optimal path connecting a first user to any one group member. In one instance, a context may indicate the first user is seeking to determine their relationship to a team. For instance, the first user may identify a particular team or group of users in Microsoft Teams or a collaboration computing application, and may query, explore, or hover their mouse over a graphical user interface indication of the team, or perform a similar operation in order to be provided information about their connectedness to the team. Similarly, path/relationship processor 274 may determine that the people on a team all report to a particular person, and an optimal path connecting the first person to that particular person may be determined (e.g., where the end points in the path correspond to the first person and the particular person who is reported to by each of the team members). Similarly still, path determiner 272 may determine a plurality of optimal paths, each connecting the first user to one member of the team (e.g., for a team of members A-n, compute: best-path(first user, A), best-path(first user, B), best-path(first user, C), . . . best-path(first user, n)), and then path/relationship processor 274 may process the plurality of optimal paths to determine, for example, commonalities such as: frequently occurring individuals in the paths (e.g., all connections go through member A or member B, and thus A and B are commonalities of the team connections); frequently occurring relationship types; an intersection, such as, for all of the optimal paths, who is the person that appears most often, which may represent the most-connected individual to the team; or other insights and connection data about the connection of the first user to team members. Similarly still, an optimal path between the first user and the team member who has the most connections with other team members may be determined by path/relationship processor 274 and used as an insight.

In still another example, a context indicating a meeting with a first user and a group of attendees may comprise processing a graph by path/relationship processor 274 to determine a subgraph indicating how the attendees are connected to each other. One example of this type of subgraph insight is illustratively depicted in FIG. 4D, which shows connection data comprising a subgraph depicting connections of the meeting attendees to each other, as further explained in connection with FIG. 4D.

In some aspects, other various insights may be determined by path/relationship processor 274 regarding a group of people. For example, for a group of users {A, B, . . . m, n}, a plurality of optimal paths may be determined, by path determiner 272, between pairs of the users, such as: {best-path(A,B), best-path(A,C), best-path(B,C), . . . best-path(m, n)}. From this plurality of optimal paths, path/relationship processor 274 may determine a union in order to identify influencers or "social hubs" of people. In particular, from among the union or combination of the optimal paths, the number of times a user occurs in the paths may be counted. Those users having the highest count represent most-connected people, who may be considered influencers or social hubs among the group. Additionally or alternatively, the most frequently occurring user(s), in the optimal paths, that is not in the group also may be determined by path/relationship processor 274. These individuals (or this person) may be provided by path/relationship processor 274 as an insight, which may be used for a variety of purposes, such as, for example, to suggest inviting those individuals to the group or as an ice breaker (e.g., everyone in the group knows Bjørn).

In some aspects, other various insights may be determined by path/relationship processor 274 regarding multiple groups of people. For example, path/relationship processor 274 may process aggregate paths to discover strong matchmakers. In particular, in the set of all optimal paths that connect a first group {A, B, C, . . . } and a second group {X, Y, Z, . . . }, path/relationship processor 274 may determine the intermediary nodes that occur the most often. These frequently occurring nodes correspond to people who are well connected to both groups. This connection data may be used, for example, to identify individuals who could facilitate introductions between the two groups. These and other similar operations will be apparent to one skilled in the art as operations that that may be performed by path/relationship processor 274 on a graph or aspect of a graph to determine an insight.

Continuing with example system 200 and graph data processor 270, connection data assembler 276, in general, is responsible for assembling, formatting, or in some instances processing connection data for presentation to a user or for consumption by a computing application or service. Embodiments of connection data assembler 276 may receive connection data, such as an information item, from path/relationship processor 274, and may provide an assembled or formatted connection data, or as aspect thereof, to presentation component 220, to a computing application or service where it may be used to provide an enhanced computing experience for a user, or may store it in storage 225 for later use. For example, the connection data may be stored in connection data 246 of a user profile 240 associated with a particular user, in one embodiment. Some embodiments of connection data assembler 276 further utilize a context, which may be determined by user activity monitor 250 (or more specifically, by context extractor 254) for the formatting and/or assembly of the connection data. Accordingly, in some embodiments, the output of connection data assembler 276 may comprise formatted or assembled connection data according to the particular context, such as described herein, and in some embodiments may further specify a presentation logic (e.g., present connection data about attendees of a meeting for 3 minutes at the beginning of a meeting or to a new user when the user enters the meeting).

In some embodiments, connection data assembler 276 may specify a format for the presentation of the connection data (which may be provided as a presentation logic), such as an ice breaker, highlight, or information item on an LPC (see, e.g., FIG. 4A), a popup window when user hovers their mouse over an indication of another user (see e.g., FIG. 4C), or a visual contextualization showing a subgraph of meeting attendee relationships (see e.g., FIG. 4D), for example. In some embodiments, particular connection data may be surfaced or provided as a highlight or an ice breaker (e.g., at the beginning or a meeting, the attendees may be presented with the ice breaker "you all know BjØrn"). Similarly, a particular attendee of the meeting, such as the meeting organizer may be provided with an insight about which of the meeting attendees are well-connected with the other attendees. This insight may help the meeting organizer to identify those attendees who are likely influencers, and thus the meeting organizer may want to try to win over those individuals during the meeting. In one embodiments, a list of the most well-connected meeting attendees may be surfaced (or all of the meeting attendees may be ranked based on their connectedness (e.g., to each other and/or to others), thereby identifying the influencers to a particular meeting attendee, such as the meeting organizer.

Example system 200 also includes storage 225. Storage 225 generally stores information including data, computer instructions (e.g., software program instructions, routines, or services), logic, profiles, and/or models used in embodiments described herein. In an embodiment, storage 225 comprises a data store (or computer data memory). Further, although depicted as a single data store component, storage 225 may be embodied as one or more data stores or may be in the cloud.

As shown in example system 200, storage 225 includes graph-construction logic 233, path logic 235, one or more graphs 230 (comprising a graph data structure, such as graph 300 in FIG. 3), as described previously, and user profile 240. One example embodiment of a user profile 240 is illustratively provided in FIG. 2. Example user profile 240 includes information about user accounts and devices 242, user data 244, connection data 246, and user preferences 248. The information stored in user profile 240 may be available to other components of example system 200, in some embodiments.

User accounts and devices 242 generally includes information about user devices accessed, used, or otherwise associated with a user, and/or information related to user accounts associated with the user, which may be used for accessing or collecting user data for the user; for example, online or cloud-based accounts (e.g., email, social media) such as a Microsoft® MSA account, Microsoft 365 account, other accounts such as entertainment or gaming-related accounts (e.g., Xbox®, Netflix®, online game subscription accounts, or similar account information), people data relating to such accounts such as user emails, texts, instant messages, calls, other communications, and other content; social network accounts and data, such as news feeds; online activity; and calendars, appointments, application data, other user accounts, or the like. Some embodiments of user accounts and devices 242 may store information across one or more databases, knowledge graphs, or data structures. As described previously, the information stored in user accounts and devices 242 may be determined from user-data collection component 210 or user activity monitor 250 (including one or more of its subcomponents).

As described previously, user data 244 generally includes information about a user, who may be associated with the user profile 240. User data 244 may include user data received from user-data collection component 210 or user data determined by user activity monitor 250, which may include user-related activity data, a context or contextual information, and user data features or structured user data, in some embodiments. Connection data 246 may include the connection data, such as insights or information items determined by graph data processor 270 with respect to a user associated with user profile 240.

User preferences 248 generally include user settings or preferences associated with embodiments described herein. By way of example and not limitation, such settings may include user configurations or preferences about the various thresholds described herein, explicitly defined relationship types or excluded relationship types, weight assignments for relationship types and/or nodes, inferred versus explicit relationships, and/or confidence values associated with an inferred relationship, other preferences or configurations regarding the presentation of connection data to the user or consumption of connection data by computing applications and services used by the user, or other preferences or configuration settings for any of the embodiments described herein.

Example system 200 may also include a presentation component 220 that is generally responsible for presenting aspects of the connection data, such as information items or insights, that may be determined by graph data processor 270, and may work in conjunction with connection data assembler 276. The content may be presented via one or more presentation components 716, described in FIG. 7. Presentation component 220 may comprise one or more applications or services on a user device, across multiple user devices, or in the cloud. For example, in one embodiment, presentation component 220 manages the presentation of connection data information items to a user across multiple user devices associated with that user, or may use presentation logic determined by connection data assembler 276. For example, presentation component 220 may determine on which user device(s) content is presented and how or how much content is presented (for example, a relationship chain may be truncated on a mobile device or a device with a smaller screen size, but presented in its entirety on a larger computer monitor), and presents connection data determined by graph data processor 270 or other components of system 200. In some embodiments, presentation component 220 can present information items, such as icebreakers or highlights proactively and dynamically, such as when a new user first speaks, or enters an on-line meeting, or joins an on-line chat session. For instance, presentation component 220 may determine when, whether, and how to determine an icebreaker people highlight (or other information item), based on a context and/or presentation logic of presentation engine 280, which may reflect a context. Similarly, in other embodiments, presentation component 220 includes functionality to enable users to see connection data associated with a virtually assembled group of people (i.e., a user selects or shows an interest in another person or people and can view aspects of connection data associated with that person or people).

Presentation component 220 may present this information, including any substitutions, reorganizations, or highlights as directed by graph data processor 270, or more specifically by connection data assembler 276. In some embodiments, this determination might be made, for example, based upon the device's screen size (with potentially more or differently formatted connection data presentable on a laptop computer as compared to a mobile phone) or the surface on which the connection data will be presented (for example a calendaring application, communication platform, or other application or program). In some embodiments, presentation component 220 can present, in a graphical user interface ("GUI"), in a number of different formats and applications, such as those shown in FIGS. 4A-4D (discussed further below). Presentation component 220 may also generate user interface features associated with or used to facilitate presenting connection data (such as described in connection with FIGS. 4A-4D). Such features can include interface elements (such as icons or indicators, graphics buttons, sliders, menus, audio prompts, alerts, alarms, vibrations, pop-up windows, notification-bar or status-bar items, in-app notifications, or other similar features for interfacing with a user), queries, and prompts.

With reference now to FIGS. 4A-4D, a number of exemplary schematic screenshots from a personal computing device are illustratively depicted showing aspects of example graphical user interfaces that include presentation of various connection data, as described herein. The connection data shown in FIGS. 4A-4D may be determined from user data for a plurality of users, such as described in connection with user-data collection component 210 and user data monitor 250 of FIG. 2. The example user relationships represented in the connection data, as well as the example subgraph and relationship chains may be determined as described in connection with graph generator 260 of FIG. 2 and graph data processor 270. Further, the example relationships represented in the connection data may comprise explicit or inferred relationships, as further described herein.

Figure 4A:
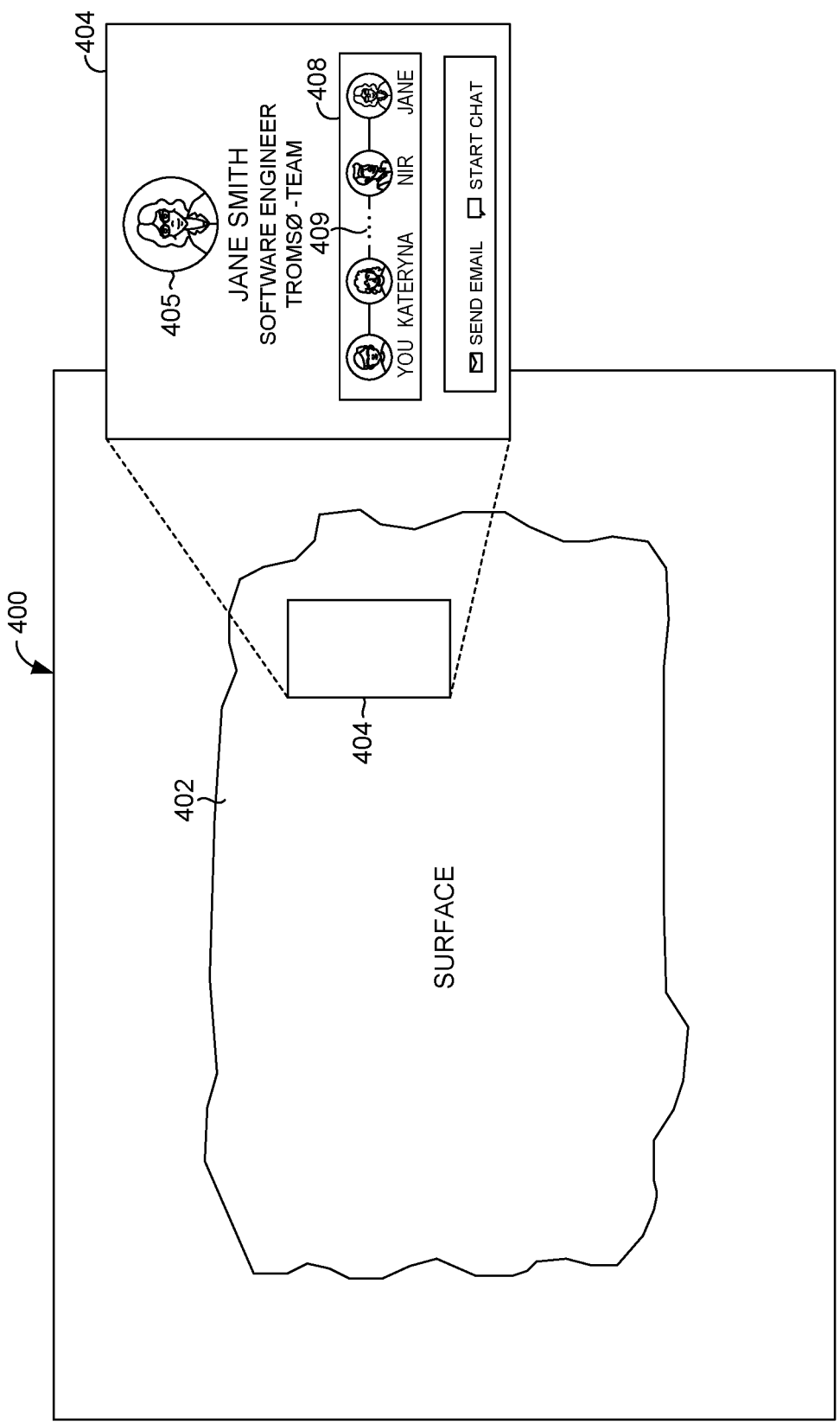
FIGS. 4A-4D illustratively depict exemplary schematic screenshots from a personal computing device showing aspects of example graphical user interfaces, in accordance with an embodiment of the present disclosure.

With reference to FIG. 4A, an exemplary schematic screen display 400 is shown, which represents a computing device, such as 102(n) discussed above with respect to FIG. 1. Screen display 400 is shown having a schematic surface 402, which could be any of a number of different computer programs, applications or other display on the computing device screen display 400. A smaller display space 404 is shown, which could be, for example, a people card or other type of informational display. Within display space 404, a number of information items are shown including item 405, and connection data item 408. In this example, item 405 indicates a particular person of interest, here Jane Smith, for which the user of a computing device having screen display 400 is being presented information. For example, the user may hover their mouse over an indicator for the person of interest, Jane Smith, and be presented with smaller display space 404. In some embodiments, item 405 may further indicate information about a person of interest such as the person's role of job title, location, contact information or contact functionality, presence, a people highlight, or other information item(s). Connection data item 408 may include an information item or insight about the user's connection to the person of interest. For instance, in the example of smaller display space 404, connection data item 408 comprises a relationship chain showing a chain of relationships to people connecting the user to the person of interest (e.g., Jane Smith). In particular, connection data item 408 shows that the user has a connection with Kateryna who has a connection with at least another person not shown, as indicated by dotted connection line 409, who has a connection with Nir, who has a connection with Jane (the person of interest). In some embodiments, the user may click or select the dotted line to see the in-between connected users that are not shown in connection data item 408. For example, in one embodiment, clicking or hovering over connection data item 408 may cause a more detailed relationship chain to be presented, such as depicted in screen display 420 of FIG. 4B, which may indicate details about each person in the connected chain of people from the user to the person of interest and/or information about the type of connection (e.g., a relationship type, such as works together or goes to the same gym).

Figure 4B:
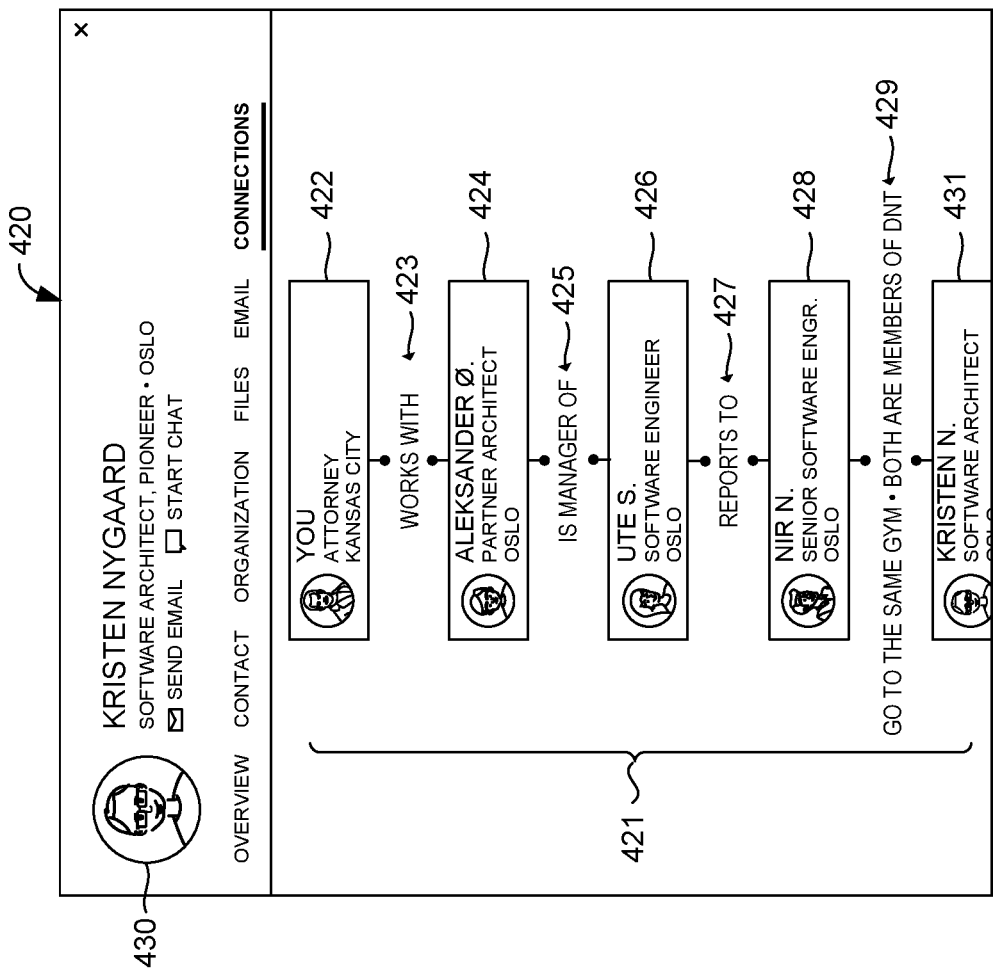

With reference to FIG. 4B, another exemplary screen display 420 is shown, which may be presented via a computing device, such as 102(n) discussed above with respect to FIG. 1. Example screen display 420 depicts a GUI showing aspects of connection data 421 between a first user and a person of interest 430; here for example, the person of interest 430 is Kristen N. Screen display 420 represents one example of a visualization that contextualizes the connections or relationships between the first person and the person of interest 430. In some embodiments, example screen display 420 may be presented to the first user based on a context such as: the first user hovering their mouse over an GUI element indicating the person of interest; selecting another aspect of a connection data corresponding to the person of interest 430, such as graph, subgraph, or path, or connection data item 408, or a similar condensed or truncated chain of relationships indicating the first user's connection to other people; querying their connection to the person of interest 430; or other context regarding a connection between the first user and person of interest 430.

Here, connection data 421 depicts a chain of relationships between a first user, indicated by item 422, and the person of interest, indicated by item 431 in the connection data 421 and corresponding to the person of interest 430 depicted at the top of exemplary screen display 420. In particular, connection data 421 shows that the first user at item 422 is connected with another user (identified as Aleksander Ø.) at item 424 and shares a connection 423 indicating a "works with" relationship with the user. Connection data 421 further shows that Aleksander (the user at item 424) has a connection 425 with the user at item 426 (identified as Ute S.) and the relationship represented in the connection 425 is "is manager of." Further still, connection data 421 shows that Ute (the user at item 426) has a connection 427 with the user at item 428 (identified as Nir N.) and the relationship represented in the connection 427 is "reports to." Finally, connection data 421 shows that Nir (the user at item 428) has a connection 429 with the person of interest at item 431, and the relationship represented in the connection 429 is that both users, Nir and the person of interest (Kristen N.), go to the same gym and are members of the trekking association, DNT. Connection 429 may represent one or two inferred relationships between Nir (the user at item 428) and the person of interest, which may be determined by user relationship determiner 262 (FIG. 2). In some embodiments, connection data 421 represents an optimal path, such as a least-cost path, between the first user (indicated at item 422) and the person of interest (indicated at item 431), which may be determined as described in connection with graph generator 260 and graph data processor 270.

Figure 4C:
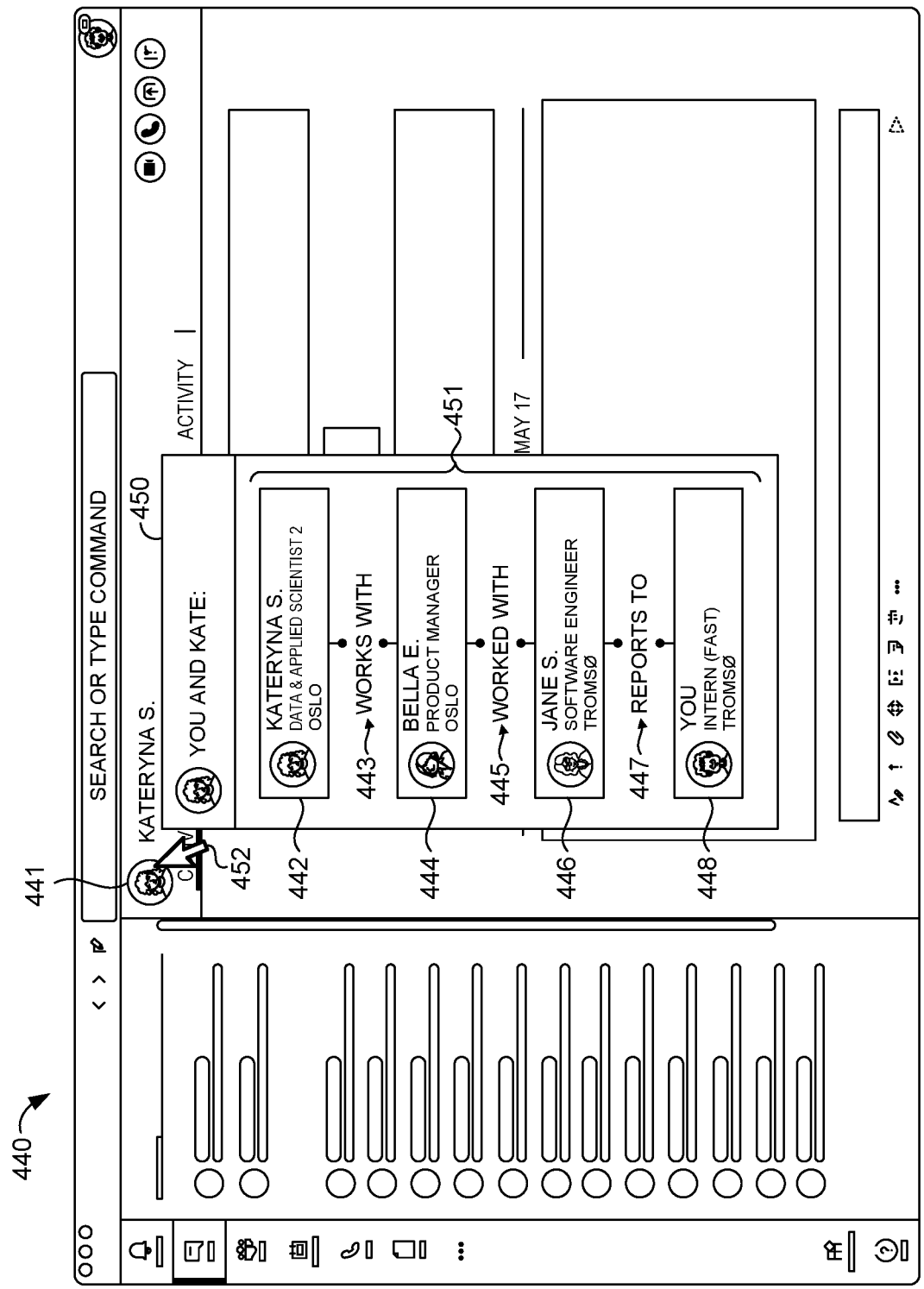

With reference to FIG. 4C, another exemplary screen display 440 is shown, which may be presented via a computing device, such as 102(n) discussed above with respect to FIG. 1. Example screen display 440 depicts a GUI associated with a communications computing application, such as Microsoft Teams®. In particular, screen display 440 depicts a smaller display space 450 showing connection data 451. Smaller display space 450 and connection data 451 represent an example of a visualization that contextualizes the connections or relationships between a first user, indicated by item 448, and a person of interest, indicated by GUI element 441 depicting a profile picture of the person of interest. In the example of FIG. 4C, smaller display space 450 may be presented to the first user based on a context such as user-related activity indicating the first user has hovered mouse pointer 452 over the GUI element 441 for the person of interest. Accordingly, in this example, smaller display space 450 may be presented in response to the first user interacting with a GUI indication 441 of another user, namely the person of interest identified in this example as Kateryna S.

Connection data 451, like connection data 421 in FIG. 4B, depicts a chain of relationships between the first user, indicated by item 448, and a person of interest, Kateryna S., indicated by item 442, which corresponds to GUI element 441 at the top of smaller display space 450. In particular, connection data 451 shows that the first user at item 448 is connected with another user (identified as Jane S.) at item 446 and shares a connection 447 indicating a "reports to" relationship. Connection data 421 further shows that Jane S. (the user at item 446) has a connection 445 with the user at item 444 (identified as Belle E.) and the relationship represented in the connection 445 is "worked with," indicating that Bella E. and Jane S. previously worked together. Further still, connection data 421 shows that Bella E. (the user at item 444) has a connection 443 with Kateryna S, the person of interest at item 442, and the relationship represented in the connection 443 indicates that Bella E. and Kateryna S. currently work with each other. In some embodiments, connection data 451 represents an optimal path, such as a least-cost path, between the first user (indicated at item 448) and the person of interest (indicated at item 442), which may be determined as described in connection with graph generator 260 and graph data processor 270.

Figure 4D:
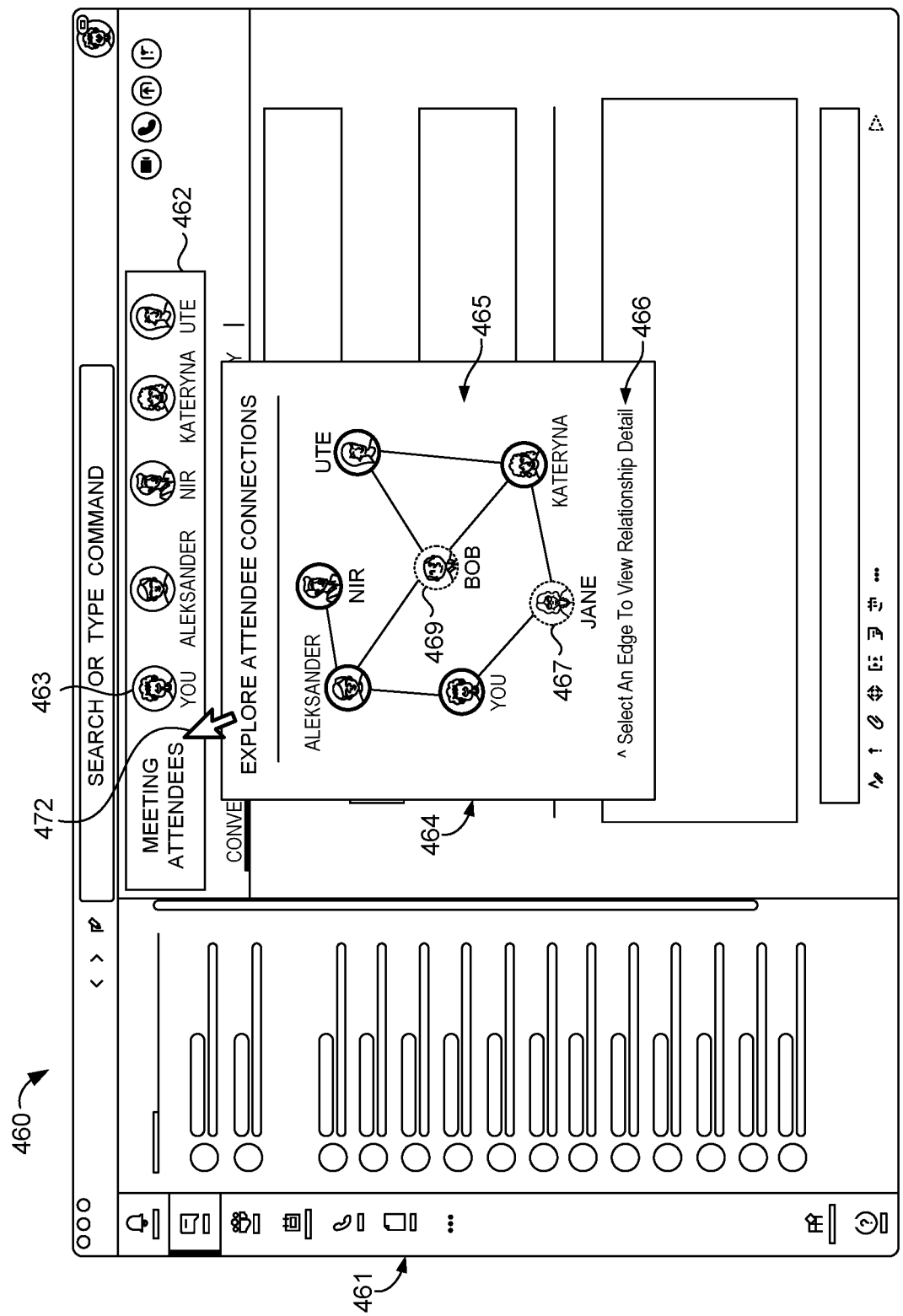

With reference to FIG. 4D, another exemplary screen display 460 is shown, which may be presented via a computing device, such as 102(n) discussed above with respect to FIG. 1. Example screen display 460 also depicts a GUI associated with a communications computing application 461, such as Microsoft Teams®. In particular, screen display 460 depicts a smaller display space 464 showing connection data 465. Smaller display space 464 and connection data 465 represent another example of a visualization that contextualizes the connections or relationships between a group of people. In this example, the group of people comprise a group of meeting attendees, indicated at item 462 of screen display 460. Item 462 indicates 5 meeting attendees are attending (or have attended or will be attending) a meeting via the communications computing application 461, including a first user (indicated at item 463 as "you" or the user who is using this instance of communications computing application 461).

In this example, smaller display space 464 may be presented to the first user based on a context such as user-related activity indicating the first user has hovered mouse pointer 472 over the GUI element 462 of the meeting attendees. Accordingly, smaller display space 464 may be presented in response to the first user interacting with a GUI indication 462 of a group of other users, namely the group of meeting attendees identified in GUI element 462. In this example, connection data 465 comprises a subgraph showing connections between the meeting attendees. Here it can be seen how the meeting attendees, including the first user, are connected to each other. Thus, connection data 465 provides a visual context of the meeting attendee relationships. Further, according to connection data 465 the meeting attendees share a connection between two other users, Jane at node 467 and Bob at node 469, who are not meeting attendees. In some embodiments, the particular connection data 465 that is presented may change dynamically as attendees change. For example, if new users join or drop off the meeting, the subgraph depicted in connection data 465 maybe updated to reflect a connection of the current meeting attendees. Alternatively or in addition, connection data 465 may depict a subgraph of all of the meeting invitees, including users who may be attending the meeting. In some embodiments, smaller display space 464 showing connection data 465 may be presented automatically at the beginning of a meeting for a duration of time, such as 30 seconds.

Accordingly, among other insights provided by connection data 465 is that meeting attendees Ute and Kateryna have a direct connection or relationship, and thus may know each other, but they do not have a direct connection to (and thus may not know) the other meeting attendees. Similarly, Aleksander has a direct connection or relationship with the first user (i.e., "you") and with Nir, which may indicate that Aleksander knows you and Nir, but neither the first user, Aleksander, nor Nir have a direct connection with Ute and Kateryna. Additionally, in this example, Bob and Jane could be presented, via another smaller display space or information item (not shown) to the attendees as icebreakers, (e.g., "everyone in the meeting knows Bob or Jane). In some embodiments including the example depicted in FIG. 4D, connection data 465 showing a subgraph may include functionality indicated by item 466 to enable a user to explore the relationship details in the subgraph such as by selecting an edge between two of the nodes corresponding to people in the subgraph.

Figure 5:
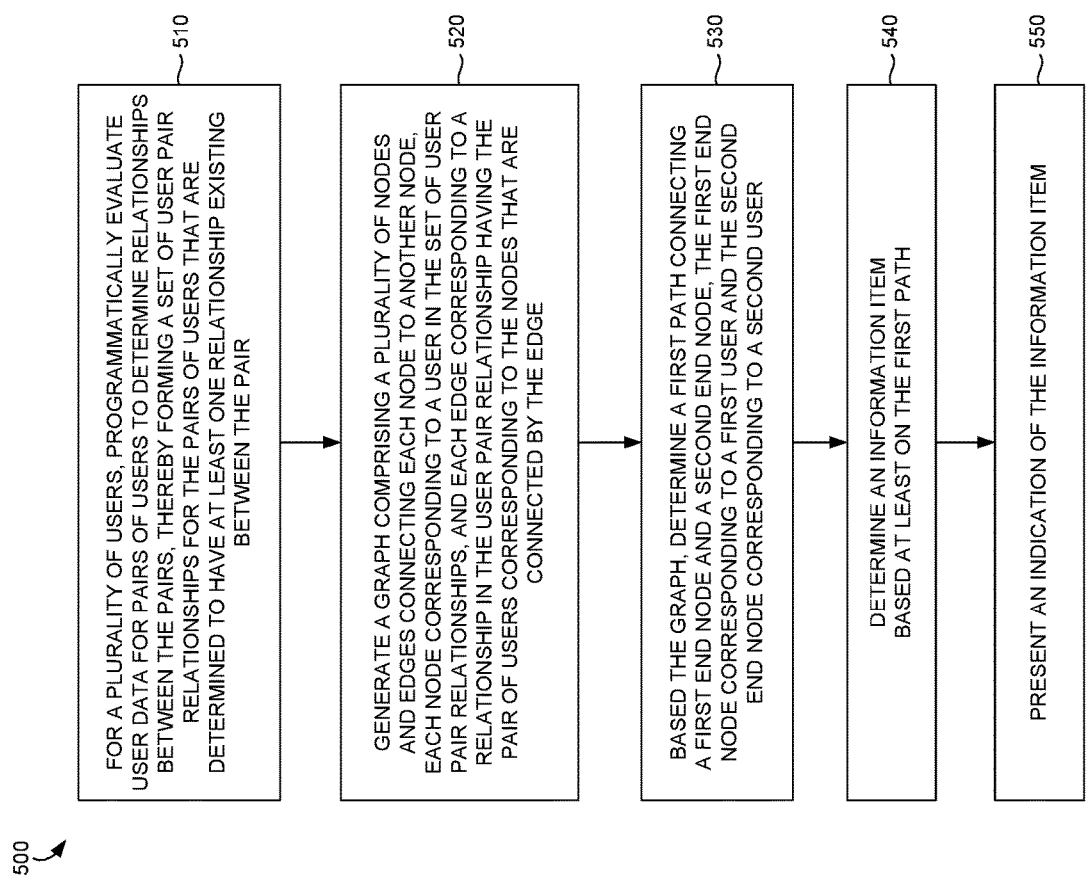
FIGS. 5 and 6 depict flow diagrams of methods for programmatically determining user-connection data and processing such data based on a context, in accordance with an embodiment of the present disclosure.
Figure 6:
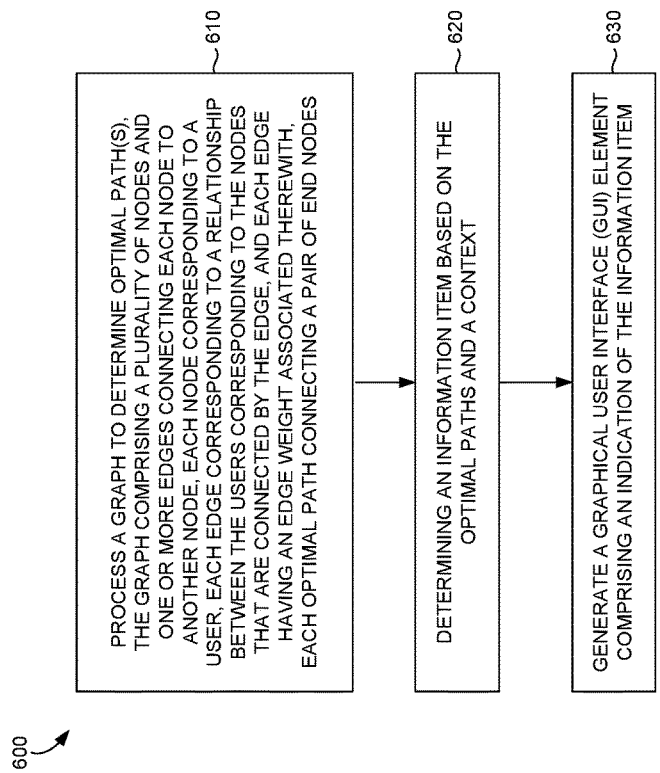

Turning now to FIGS. 5 and 6, aspects of an example process flows 500 and 600 are illustratively depicted for some embodiments of the disclosure. Process flows 500 and 600 each may comprise a method (sometimes referred to herein as method 500 and method 600) that may be carried out to implement various example embodiments described herein. For instance, process flow 500 or process flow 600 may be performed to programmatically determine user-connection data by processing a graph data structure, that may be used to provide any of the improved electronic communications technology or enhanced user computing experiences described herein.

Each block or step of process flow 500, process flow 600, and other methods described herein comprises a computing process that may be performed using any combination of hardware, firmware, and/or software. For instance, various functions may be carried out by a processor executing instructions stored in memory, such as memory 712 described in FIG. 7 and/or storage 225 described in FIG. 2. The methods may also be embodied as computer-usable instructions stored on computer storage media. The methods may be provided by a stand-alone application, a service or hosted service (stand-alone or in combination with another hosted service), or a plug-in to another product, to name a few. The blocks of process flow 500 and 600 that correspond to actions (or steps) to be performed (as opposed to information to be acted on) may be carried out by one or more computer applications or services, in some embodiments, that may operate on one or more user devices (such as user device 102a), servers (such as server 106), may be distributed across multiple user devices and/or servers, or by a distributed computing platform, and/or may be implemented in the cloud. In some embodiments, the functions performed by the blocks or steps of process flows 500 and 600 are carried out by components of system 200, described in connection to FIG. 2.

With reference to FIG. 5, aspects of example process flow 500, for determining user-connection data and in some embodiments, processing such data based on a context, are illustratively provided. In particular, example process flow 500 may be performed to generate a graph data structure comprising user-connection data for a plurality of users, and further to process the graph data structure to determine an information item, such as an insight about the user-connection data, as described in connection with FIG. 2. The information item may be determined based on one or more optimal paths determined by processing the graph data structure, and may further be determined based on a context, in some embodiments, such as described in connection with FIG. 2.

At a block 510, method 500 includes determining relationships between pairs of users, of a plurality of users, by evaluating user data for each pair of users. In particular, the user data may characterize each user, and thus by evaluating the user data for a pair of users, embodiments of block 510 may determine a relationship between the users, from the evaluation, such as a connection based on the user data based. For instance, both users work in the same location, go to the same gym, or a first user of the pair reports to the second user, and the second user is a manager of the first user. In some embodiments of block 510, the evaluation comprises performing a comparison of the user data for the pair. The comparison may comprise a similarity comparison, such as a distance measurement or a comparison or user data features or structured user data, such as described in connection with user relationship determiner 262 of FIG. 2.

Some embodiments of block 510 may further comprise receiving or determining user data for at least one of the users. For example, in some embodiments, user data for a particular user may be determined from an embodiment of user-data collection component 210 or a user activity monitor 250 (FIG. 2), which may comprise a sensor configured to provide user data about the user. In some embodiments, the user data may comprise user-related activity data. In some embodiments, the user data may be converted into structured data or user data features may be extracted so that the structured user data or user data features may be used in the evaluation of block 510 to determine a relationship between a pair of users.

In some instances, block 510 may determine that a relationship does not exist between a pair of users, and in other instances, block 510 may determine that multiple relationships exist between a pair of users. For example, a comparison of the user data for a particular pair of users may indicate multiple connections. Embodiments of block 510 determine a set of user-pair relationships for each pair of users in the plurality for which a relationship is determined. As described herein, a user-pair relationship may identify two users and information indicating at least one relationship between the two users (e.g., user A shares at least one relationship with user B and the relationship(s) are: works with; or user C shares a relationship with user D, and the relationship(s) are: works with, reports to, and goes to the same gym. In some instances, an embodiment of block 510 may infer a relationship between a pair of users, as described in connection with user relationship determiner 262.

Some embodiments of block 510 utilize graph construction logic, such as graph construction logic 233 described in connection with FIG. 2, to determine similarity or a relation in the user data for a pair of users indicating a connection between the pair of users. Embodiments of block 510 may be carried out using graph generator 260 (FIG. 2) and/or user data monitor 250 (FIG. 2) in some implementations. Additional details of embodiments of block 510, or for carrying out operations of block 510, are described in connection to FIG. 2, and in particular graph generator 260.

At block 520, method 500 includes generating a graph data structure. The graph data structure may be generated based on user-connection data for a plurality of users, such as the user-pair relationships determined in block 510. In particular, embodiments of block 510 generate a graph comprising a plurality of nodes and edges connecting each node to another node. Each node corresponds to a user in the user-pair relationships, and each edge corresponding to a relationship in the particular user-pair relationship having the pair of users corresponding to the nodes that are connected by that edge. Some embodiments of block 520 further determine an edge weight for the edges of the graph, so that the generated graph includes weighted edges. Some embodiments of block 520 also may determine node weights, such as described herein. In some embodiments, the edge weight may be determined based on a type of relationship that the edge corresponds to; for instance, as described herein some relationship types, such as a "works with" relationship may have a different weight than other types of relationships, such as reports to. Similarly explicit relationships and inferred relationships may have different weights, such as described herein. In some embodiments, a graph generated at block 520 may include edges corresponding to different types of relationships, and may further include pairs of nodes having multiple edges connecting the pair. Some embodiments of block 520 utilize an embodiment of graph construction logic 233 described in connection with FIG. 2, to generate a graph. Block 520 may be carried out using an embodiment of graph generator 260 (FIG. 2). Additional details of embodiments of block 510, or for carrying out operations of block 510, are described in connection to FIG. 2, and in particular graph generator 260.

At a block 530, a first path is determined, based on the graph determined in block 520. The first path connects a first end node, corresponding to a first user, and a second end node, corresponding to a second user. Thus the path comprises at least the two end nodes and the edges connecting the nodes. In some embodiments of block 530 the path comprises an optimal path between the first and second end nodes, such as a least-cost path, which may be determined based on the edge weights (or further determined based on node weights, for graphs that have node weighting.) Further, some embodiments of block 530 may determine a plurality of optimal paths, with each path connecting two end nodes.

Some embodiments of block 530 may determine a path (or optimal path) according to a context, such as described in connection with path determiner 272 of FIG. 2. For example, one embodiment of a context may comprise a constraint or criterion, such as a requirement to exclude or include a particular user (corresponding to a particular node) in the path determined at block 530. Another example context may indicate that a plurality of optimal paths should be determined at block 530. For example, an application context or a context related to a user query may indicate determining an optimal path between pairs of users in a group of users, such as attendees of a meeting.

Embodiments of block 530 may utilize path logic 235 to determine the one or more paths, including one or more optimal paths. Block 530 may be performed by an embodiment of path determiner 272 (FIG. 2). Additional details of embodiments of block 530, or for carrying out operations of block 530, are described in connection to FIG. 2, and in particular graph data processor 270 and path determiner 272.

At a block 540, an information item may be determined based at least on the first path. For example and as further described herein, an information item may comprise user-connection data regarding one or more optimal paths, a graph or subgraph, or related information such as information about users, user data, or relationships, which may be determined based on user-connection data. In some embodiments, an information item may comprise an insight or may be formatted as or assembled into an insight, such as by connection data assembler 276 (FIG. 2). In embodiments of method 500 where multiple paths (or multiple optimal paths) are determined, block 540 may comprise determining an information item based on the plurality of paths, or based on at least a portion of the plurality of paths. For example, a plurality of optimal paths connecting pairs of users in a group may be processed to determine an information item indicating the node (or the corresponding user) occurring most often in the plurality of optimal paths. Based on this information item, an insight may be provided that the user corresponding to the node is a well-connected user in the group, and thus may be regarded as influential in the group. Block 540 may be carried out using an embodiment of path/relationship processor 274 (FIG. 2). Additional details of embodiments of block 540, or for carrying out operations of block 540, are described in connection to FIG. 2, and in particular graph data processor 270 and path/relationship processor 274.

At a block 550, method 500 presents an indication of the information item determined in block 540. For example and as further described herein, embodiments of block 550 may format or assemble the information item for presentation. Some embodiments of block 550 may determine the assembly or format based in part on a context, and some embodiments may comprise determining a presentation logic or determining a format for presentation of the indication of the information item. Further, some embodiments of block 550 include generating a GUI element comprising an indication of the information item. The indication of an information item presented at block 550 may comprise, by way of example and not limitation, an ice breaker, highlight, or information item on an LPC (see, e.g., FIG. 4A), a popup window when user hovers their mouse over an indication of another user (see e.g., FIG. 4C), or a visual contextualization showing a subgraph of meeting attendee relationships (see e.g., FIG. 4D), for example. In one embodiment the indication of the information item comprises a relationship chain (see e.g., FIG. 4B) including a connection for each user to another user in an optimal path determined at block 530. In some embodiments, the relationship chain may further include a relationship indication for each connection, such as an indication of the type of the relationship, or a strength of the relationship, in some embodiments where the relationship is inferred. Some embodiments of block 550 may be carried out by path/relationship processor 274 (FIG. 2). Additional details of embodiments of block 550, or for carrying out operations of block 550, are described in connection to FIG. 2, and in particular graph data processor 270 and connection data assembler 276. Several example aspects of block 550 are illustratively depicted in FIGS. 4A-4D and described further in connection with these drawings.

With reference to FIG. 6, aspects of example process flow 600, for determining user-connection data and in some embodiments, processing such data based on a context, are illustratively provided. In particular an at a high level, example process flow 600 may be performed to process a graph data structure representing user-connection data for a plurality of users, to determine an information item, such as an insight about the user-connection data, as described in connection with FIG. 2. The information item may be determined based on one or more optimal paths determined by processing the graph data structure, and may further be determined based on a context, in some embodiments, such as described in connection with FIG. 2.

Accordingly, at block 610, the method 600 includes processing a graph to determine one or more optimal paths. The graph may comprise a graph data structure, such as such as described in connection with graph generator 260 (FIG. 2) or graph 300 (FIG. 3). The graph may comprise a plurality of nodes and one or more edges connecting each node to another node, each node corresponding to a user, each edge corresponding to a relationship between the users corresponding to the nodes that are connected by the edge. Further the edges of the graph may be weighted, and determining an optimal path may comprise determining a least-cost path according to the weights. For example, in some instances, the edges of the graph may be weighted based on a relationship type for the relationship corresponded to by the edge, and/or based on a confidence associated with an inferred relationship corresponding to an edge. Some embodiments of the processing at block 610 may comprise processing a graph that has at least one edge corresponding to an inferred relationship, at least two edges correspond to different types or relationships, and/or at least one pair of nodes is connected by at least two edges.

Embodiments of block 610 may utilize path logic 235 to determine the optimal paths. Some embodiments of block 610 may be implemented as an embodiment of block 530 (process flow 500). Further, block 610 may be performed by an embodiment of path determiner 272 (FIG. 2). Additional details of embodiments of block 610, or for carrying out operations of block 610, are described in connection to FIG. 2, and in particular graph data processor 270 and path determiner 272.

At a block 620, method 600 determines an information item based on one or more of the optimal paths determined at block 610, and in some embodiments based on a context. As further described herein, an information item may comprise user-connection data regarding one or more optimal paths, a graph or subgraph, or related information, such as information about users, user data, or relationships, which may be determined based on user-connection data, may be in the form of an insight or used to derive an insight. In some embodiments, an information item may be formatted as or assembled into an insight, such as by connection data assembler 276 (FIG. 2). In embodiments of method 600 where multiple paths (or multiple optimal paths) are determined, block 620 may comprise determining an information item based on the plurality of paths, or based on at least a portion of the plurality of paths.

Some embodiments of block 620 may determine an information item based on a context, such as described further in connection with path/relationship processor 274. For instance, the context may comprise information regarding a particular user to be included or excluded in at least one optimal path, a computing application context, information about at least one user of interest, a relationship query, which may be performed by a user or computing service, or other examples as described herein. In some embodiments, one or more of the optimal paths that are determined at block 610 may be determined based on the information item determined at block 620 and/or the context. For instance, determining an information item based on a context, at block 620, may comprise determining another optimal path, or using information from one or more optional paths to determine an additional optimal path. For example, a context may indicate a group of users, and a set of optimal paths may be determined between each pair of users in the group. From this set of optimal paths, a node that occurs most often (or least often) may be determined. Thus, the user corresponding to this node is represents a user who is well-connected to this group, and perhaps influential (or represents a user who is not-well connected for a node that occurs least often). As such, information about the well-connected or influential user may comprise an insight. Further, an additional optimal path may be determined between end nodes corresponding to a first user and the well-connected or influential users. In this way, the first user may derive an insight regarding their connection or relatedness to the well-connected user.

Some embodiments of block 620 may be implemented as an embodiment of block 540 (process flow 500). Further, block 620 may be carried out using an embodiment of path/relationship processor 274 (FIG. 2). Additional details of embodiments of block 620, or for carrying out operations of block 620, are described in connection to FIG. 2, and in particular graph data processor 270 and path/relationship processor 274.

At a block 630, method 600 generates a GUI element comprising an indication of the information item determined at block 620. In particular a GUI element comprising an indication of the information item may be determined based on processing, formatting or assembling the information item. For example and as further described herein, and in particular in connection with connection data assembler 276 and presentation component 220, an information item may be formatted, assembled, or otherwise processed for presentation or for consumption by a computing application or service.

Accordingly, by way of example and not limitation, a GUI element generated at block 630 may comprise a visual indication of an ice breaker, highlight, or information item that is presented as a GUI element on an LPC (see, e.g., FIG. 4A), a window or surface element of a GUI that is presented when user hovers their mouse over an indication of another user (see e.g., FIG. 4C), or a visual contextualization showing a subgraph of meeting attendee relationships (see e.g., FIG. 4D), for example. In one embodiment, a GUI element may comprise a visual indication of a relationship chain (see e.g., FIG. 4B), and may further include GUI elements including a connection for each user to another user in the chain and/or an indication of the relationship for each connection, such as an indication of the type of the relationship, or a strength of the relationship, in some embodiments where the relationship is inferred.

Another example of a GUI element generated at block 630 comprises a visual indication regarding a most-connected user. For where a context indicates a group of users and a plurality of optimal paths are determined among pairs of users in the group, the most connected user in the group may be determined by determining a node that occurs most frequently in the plurality of optimal paths. In some embodiments a GUI element comprising an indication of regarding the most-connected user in a group may be presented to a particular user, such as where the group of users are meeting attendees and the meeting organizer is presented with a GUI element indicating who, among the meeting attendees, is the most connected, and thus may be regarded as being influential. As another example, a similar GUI element may comprise an aspect of a relationship chain between the meeting organizer and the most connected user, so that the meeting organizer is provided with a contextual visualization regarding their connectedness to an influential member of the group.

Still another example of a GUI element generated at block 630 comprises a recommendation regarding meeting scheduling or a suggested recipient of an electronic communication, such as an email or group chat. For example, suppose a context indicates that some users in a group of users are invitees to a meeting and some users are not. Then from a plurality of optimal paths between pairs of users in the group, an information item may be determined (e.g., at block 620) regarding who is the most connected user among the invitees and/or who is the most connected user among users who are not invitees. This information item may be processed for consumption by a communications computing application or service, such as an email or meeting scheduling application. Accordingly, one example of a GUI element generated a block 630 may comprise a recommendation presented via a meeting scheduling application, regarding the most connected invitee or the most connected user who is not an invitee. For example, the recommendation may comprise a suggestion to that the meeting organizer to consider inviting the most connected user who is not an invitee. Or the GUI element may comprise a recommended meeting time that is determined, at least in part, based on the availability of the most connected invitee, or based on prioritizing the availability of the most connected invitee over other invitees who may be not as connected. Another example of a GUI element may comprise a recommendation presented via a communications application comprising a suggestion to the email or message author regarding recipients of a message. For example, a recommendation may be provided suggesting the message author include the most connected user who is an invitee and/or the most connected user who is not an invitee, as a recipient.

Several example aspects of GUI elements that may be generated at block 630 are illustratively depicted in FIGS. 4A-4D and described further in connection with these drawings. Some embodiments of block 630 may be implemented as an embodiment of block 550 (process flow 500). Further, block 630 may be carried out using an embodiment of connection data assembler 276 and/or presentation component 220 (FIG. 2). Additional details of embodiments of block 630, or for carrying out operations of block 630, are described in connection to FIG. 2, and in particular connection data assembler 276 and presentation component 220.

Accordingly, we have described various aspects of technology directed to systems and methods for intelligently processing and presenting user-connection data on a computing device. It is understood that various features, subcombinations, and modifications of the embodiments described herein are of utility and may be employed in other embodiments without reference to other features or subcombinations. Moreover, the order and sequences of steps shown in the example methods 500 and 600 are not meant to limit the scope of the present disclosure in any way, and in fact, the steps may occur in a variety of different sequences within embodiments hereof. Such variations and combinations thereof are also contemplated to be within the scope of embodiments of this disclosure.

Other Embodiments

In some embodiments, a computerized system, such as the computerized system described in any of the embodiments above, comprises at least one processor, computer memory having computer-readable instructions embodied thereon that, when executed by the at least one processor, cause the one or more processors to perform operations. The operations comprise, for the plurality of users, each user having corresponding user data characterizing the user, programmatically evaluating the user data for each pair of users in the plurality to determine whether at least one relationship exists between the pair of users, thereby forming a set of user-pair relationships for the pairs of users determined to have at least one relationship existing between the pair. The operations may include, based on the set of user-pair relationships, generating a graph data structure comprising a plurality of nodes and one or more edges connecting each node to another node, each node corresponding to a user in the set of user-pair relationships, and each edge corresponding to a relationship in the user-pair relationship having the pair of users corresponding to the nodes that are connected by the edge. The operations may further include, based the graph data structure, determining a first path connecting a first end node and a second end node, the first end node corresponding to a first user and the second end node corresponding to a second user. The operations may further include determining an information item based at least on the first path. The operations may further include causing to present an indication of the information item. In this way, these embodiments enable an improved user experience across a number of computer devices, applications and platforms. Also in this way, these and other embodiments, as described herein, enable a very large scale of operations created by software-based services that cannot be managed by humans to operate in an efficient manner while determining, presenting, and processing user-connection data and using such data for the provisioning of new functionality for computing applications. Further still, these and other embodiments, as described herein, cause certain, user-connection data shared among two or more users to be programmatically surfaced and presented without requiring computer tools and resources for a user to manually perform operations to produce this outcome. Still further, in this way, these and other embodiments, as described herein, reduce or eliminate a need for certain databases, data storage, and computer controls for enabling manually performed steps by an administrator, to search, identify and assess, and configure (e.g., by hard-coding) specific, static relationship information to be presented to users, thereby reducing the consumption of computing resources.

In any combination of the above embodiments of the computerized system, the operations can further comprise for each edge, determining an edge weight based on the relationship corresponded to by the edge; and wherein the first path comprises an optimal path that is determined based on the edge weights.

In any combination of the above embodiments of the computerized system, the operations can further comprise determining the optimal path according to a context specifying that a third user is to be included in the optimal path or a third user is to be excluded in the optimal path; and wherein the optimal path comprises a least-cost path.

In any combination of the above embodiments of the computerized system, the indication of the information item comprises a relationship chain including: a connection for each user corresponding to a node in the optimal to another user corresponding to another node in the optimal path, and a relationship indication for each connection; and wherein at least two of the relationship indications are different.

In any combination of the above embodiments of the computerized system, the plurality of users comprises at least three users, and further comprising: determining an optimal path between nodes corresponding to each of the pairs of users, each optimal path including at least three nodes, thereby forming a plurality of optimal paths; and wherein the information item is determined based at least on a portion of the plurality of optimal paths.

In any combination of the above embodiments of the computerized system, the indication of the information item comprises information regarding at least one of: a most-connected user corresponding to a node that occurs most frequently in the plurality of optimal paths, a least-connected user corresponding to a node that occurs least frequently in the plurality of optimal paths, a recommendation for scheduling a meeting, and a suggested recipient of an electronic message.

In any combination of the above embodiments of the computerized system, at least one edge corresponds to an inferred relationship; wherein a first relationship, corresponded to by a first edge, and a second relationship, corresponded to by a second edge, are different types of relationships; and wherein at least one pair of nodes is connected by at least two edges.

In any combination of the above embodiments of the computerized system, programmatically evaluating the user data for each pair of users comprises performing a comparison of at least a first portion of the user data for each user in the pair; and wherein the user data comprises one or more user data features or structured user data.

In any combination of the above embodiments of the computerized system, the system further comprises a sensor configured to provide sensor data including user-related activity data; and wherein the operations performed further comprise determining, using the sensor, at least a second portion of the user data for the first user, the second portion comprising a user-related activity data for the first user.

In any combination of the above embodiments of the computerized system, the user data for each pair of users are programmatically evaluated to determine if a plurality of relationships exist between the users by performing multiple comparisons, each comparison performed on a portion of the user data for each pair of users, and based on each comparison, determining a relationship exists or does not exist between the pair of users.

In some embodiments, a computer-implemented method is provided process user-connection data to provide an enhanced computing experience. The method may include processing a graph data structure to determine one or more optimal paths, the graph data structure comprising a plurality of nodes and one or more edges connecting each node to another node, each node corresponding to a user, each edge corresponding to a relationship between the users corresponding to the nodes that are connected by the edge, and each edge having an edge weight associated therewith, each optimal path connecting a pair of end nodes and including at least three nodes. The method further includes determining an information item based on the one or more optimal paths and a context. The method further includes generating a graphical user interface (GUI) element comprising an indication of the information item. In this way, these embodiments enable an improved user experience across a number of computer devices, applications and platforms. Also in this way, these and other embodiments, as described herein, enable a very large scale of operations created by software-based services that cannot be managed by humans to operate in an efficient manner while determining, presenting, and processing user-connection data and using such data for the provisioning of new functionality for computing applications. Further still, these and other embodiments, as described herein, cause certain, user-connection data shared among two or more users to be programmatically surfaced and presented without requiring computer tools and resources for a user to manually perform operations to produce this outcome. Still further, in this way, these and other embodiments, as described herein, reduce or eliminate a need for certain databases, data storage, and computer controls for enabling manually performed steps by an administrator, to search, identify and assess, and configure (e.g., by hard-coding) specific, static relationship information to be presented to users, thereby reducing the consumption of computing resources.

In any combination of the above embodiments at least one edge corresponds to an inferred relationship; wherein a first relationship, corresponded to by a first edge, and a second relationship, corresponded to by a second edge, are different types of relationships; wherein at least one pair of nodes is connected by at least two edges; and wherein the context comprises at least one of: a constraint specifying a particular user to be included or excluded in at least one optimal path, a computing application context, information about at least one user of interest, and a relationship query.

In any combination of the above embodiments, for each edge corresponding to an inferred relationship, the edge weight of the edge is based on at least a confidence associated with the inferred relationship.

In any combination of the above embodiments, each of the one or more optimal paths comprise a least-cost path; and wherein each edge weight is based on a relationship type for the relationship corresponded to by the edge.

In any combination of the above embodiments the graph data structure is processed to determine a plurality of optimal paths; and wherein the information item is determined based on at least a portion of the plurality of optimal paths.

In any combination of the above embodiments the context indicates at least a portion of the users are potential invitees of a meeting; and determining the information item comprises at least one of: identifying a most-connected potential invitee by determining, from among one or more nodes occurring in the plurality of optimal paths and corresponding to users who are not potential invitees, a first node that occurs most frequently in the plurality of optimal paths; and identifying a most-connected user who is not a potential invitee by determining from among one or more nodes occurring in the plurality of optimal paths and corresponding to users who are not potential invitees, determining a second node that occurs most frequently in the plurality of optimal paths, and wherein the context indicates at least some of the users are not potential invitees of a meeting.

In any combination of the above embodiments the indication of the information item comprises at least one of: an indication of the a most-connected potential invitee, an indication of the most-connected user who is not a potential invitee, a recommendation for scheduling a meeting based on the most-connected potential invitee or the most-connected user who is not a potential invitee, and a suggested recipient of an electronic communication that is the most-connected potential invitee or the most-connected user who is not a potential invitee.

In any combination of the above embodiments the GUI element comprises at least one of: a subgraph of the graph data structure that is determined based on the information item; a visual indicator of an information item regarding a most-connected user that is determined based on determining a first node that occurs most frequently in the plurality of paths; a first relationship chain that is determined based on a first optimal path that has the least cost among a group of optimal paths, of the plurality of optimal paths, the group of optimal paths comprising each optimal path that has an end node corresponding to the a user; and a second relationship chain that is determined based on a second optimal path having a first end node corresponding to the first user and a second end node corresponding to the first node that occurs most frequently in the plurality of paths.

In some embodiments, one or more computer storage media having computer-executable instructions embodied thereon that when executed by at least one computer processor, cause operations to be performed. The operations may include processing a graph data structure to determine one or more optimal paths, the graph data structure comprising a plurality of nodes and one or more edges connecting each node to another node, each node corresponding to a user, each edge corresponding to a relationship between the users corresponding to the nodes that are connected by the edge, and each edge having an edge weight associated therewith, each optimal path connecting a pair of end nodes and including at least three nodes. The operations further include determining an information item based on the one or more optimal paths and a context. The operations further include causing to present an indication of the information item. In this way, these embodiments enable an improved user experience across a number of computer devices, applications and platforms. Also in this way, these and other embodiments, as described herein, enable a very large scale of operations created by software-based services that cannot be managed by humans to operate in an efficient manner while determining, presenting, and processing user-connection data and using such data for the provisioning of new functionality for computing applications. Further still, these and other embodiments, as described herein, cause certain, user-connection data shared among two or more users to be programmatically surfaced and presented without requiring computer tools and resources for a user to manually perform operations to produce this outcome. Still further, in this way, these and other embodiments, as described herein, reduce or eliminate a need for certain databases, data storage, and computer controls for enabling manually performed steps by an administrator, to search, identify and assess, and configure (e.g., by hard-coding) specific, static relationship information to be presented to users, thereby reducing the consumption of computing resources.

In any combination of the above embodiments the graph data structure is processed to determine a plurality of optimal paths; and the information item is determined based on at least a portion of the plurality of optimal paths.

In any combination of the above embodiments the indication of the information item comprises at least one of: a subgraph of the graph data structure that is determined based on the information item; a visual indicator of at least a well-connected user corresponding to a node that occurs most frequently in the plurality of paths; a first relationship chain that is determined based on a first optimal path that has the least cost among a group of optimal paths, of the plurality of optimal paths, the group of optimal paths comprising each optimal path that has an end node corresponding to the a user; and a second relationship chain that is determined based on a second optimal path having a first end node corresponding to the first user and a second end node corresponding to the node that occurs most frequently in the plurality of paths.

Overview of Exemplary Operating Environment

Figure 7:
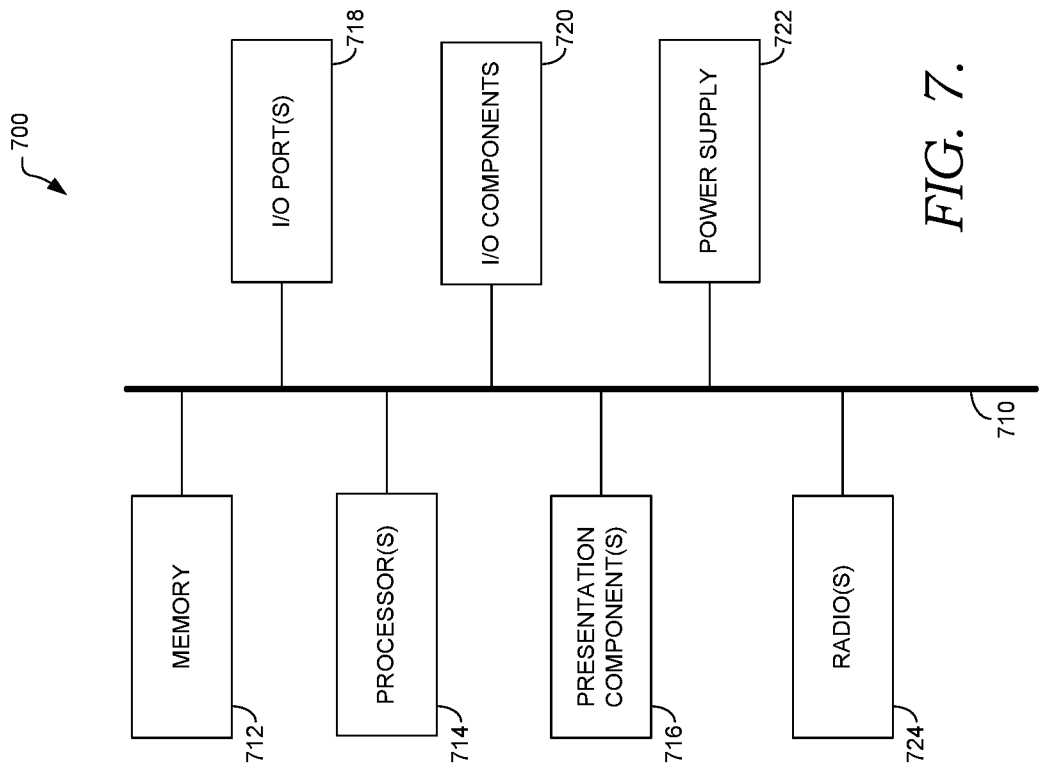
FIG. 7 is a block diagram of an exemplary computing environment suitable for use in implementing an embodiment of the present disclosure.

Having described various implementations, an exemplary computing environment suitable for implementing embodiments of the disclosure is now described. With reference to FIG. 7, an exemplary computing device is provided and referred to generally as computing device 700. The computing device 700 is but one example of a suitable computing environment and is not intended to suggest any limitation as to the scope of use or functionality of embodiments of the disclosure. Neither should the computing device 700 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, or more specialty computing devices. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 7, computing device 700 includes a bus 710 that directly or indirectly couples the following devices: memory 712, one or more processors 714, one or more presentation components 716, one or more input/output (I/O) ports 718, one or more I/O components 720, and an illustrative power supply 722. Bus 710 represents what may be one or more busses (such as an address bus, data bus, or combination thereof). Although the various blocks of FIG. 7 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 7 is merely illustrative of an exemplary computing device that can be used in connection with one or more embodiments of the present disclosure. Distinction is not made between such categories as "workstation," "server," "laptop," or "handheld device," as all are contemplated within the scope of FIG. 7 and with reference to "computing device."

Computing device 700 typically includes a variety of computer-readable media. Computer-readable media can be any available media that can be accessed by computing device 700 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include for example solid-state memory, hard drives, and optical-disc drives. Computing device 700 includes one or more processors 714 that read data from various entities such as memory 712 or I/O components 720. Presentation component(s) 716 presents data indications to a user or other device. Exemplary presentation components include a display device, speaker, printing component, vibrating component, and the like.

The I/O ports 718 allow computing device 700 to be logically coupled to other devices, including I/O components 720, some of which may be built in. Illustrative components include a microphone, joystick, game pad, satellite dish, scanner, printer, or a wireless device. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

Some embodiments of computing device 700 may include one or more radio(s) 724 (or similar wireless communication components). The radio transmits and receives radio or wireless communications. The computing device 700 may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (for example, a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A computer system to determine user-connection data for a plurality of users, the computer system comprising:
   at least one processor; and
   computer memory having computer-readable instructions embodied thereon that when executed by the at least one processor perform operations comprising:
   for the plurality of users, each user having corresponding user data characterizing the user, programmatically evaluating the user data for each pair of users in the plurality to determine whether at least one relationship exists between the pair of users, thereby forming a set of user-pair relationships for the pairs of users determined to have at least one relationship existing between the pair;
   based on the set of user-pair relationships, generating a graph data structure comprising a plurality of nodes and one or more edges connecting each node to another node, each node corresponding to a user in the set of user-pair relationships, and each edge corresponding to a relationship of one of a plurality of relationship types existing between users corresponding to the nodes that are connected by the edge;
   detecting an interaction between a first user and a graphical user interface (GUI) element displayed on a user interface of a communication application, the GUI element identifying a second user;
   in response to detection of the interaction, querying the graph data structure to identify connection data describing a path within the graph data structure that extends between a first node corresponding to the first user and a second node corresponding to the second user, the connection data identifying:
   a user identifier of a third user corresponding to a third node in the path between the first node and the second node;
   a relationship type identifier for each edge in the path identifying a relationship between users corresponding to nodes connected by the edge; and
   presenting the connection data in the GUI element on the user interface.

2. The computer system of claim 1, wherein the operations further comprise:
   assigning edge weights to edges in the graph data structure, the edge weights being representative of select different relationship types of the plurality of relationship types;
   computing a path cost for each of multiple paths between a first node and a second node that respectively correspond to different relationship types of the plurality of relationship types, the path cost being based on a sum of the edge weights corresponding to edges within the path;
   based on the path cost computed for each path of the multiple paths between the first node and the second node, identifying an optimal path between the first node and the second node and a select relationship type corresponding to at least one edge in the optimal path, wherein querying the graph data structure to identify connection data describing the path within the graph data structure further comprises querying the graph data structure to return the optimal path.

3. The system of claim 2, wherein the operations further comprise determining the optimal path according to a context specifying that a third user is to be included in the optimal path or the third user is to be excluded in the optimal path; and wherein the optimal path comprises a least-cost path.

4. The system of claim 2, wherein presenting the connection data in the GUI element includes presenting a relationship chain including: a connection for each user corresponding to a node in the optimal path to another user corresponding to another node in the optimal path, and the relationship type identifier for each connection; and wherein the relationship identifier is different for at least two of the edges in the optimal path.

5. The system of claim 1, wherein the plurality of users comprises at least three users, and further comprising:
determining an optimal path between nodes corresponding to each of multiple pairs of users, each optimal path including at least three nodes, thereby forming a plurality of optimal paths; and
wherein the connection data includes at least on a portion of the plurality of optimal paths.

6. The system of claim 1, wherein the GUI element presents user contact information or identifies attendees to a meeting.

7. The system of claim 1, wherein programmatically evaluating the user data for each pair of users comprises performing a comparison of at least a first portion of the user data for each user in the pair; and wherein the user data comprises one or more user data features or structured user data.

8. The system of claim 7 further comprising a sensor configured to provide sensor data including user-related activity data; and wherein the operations performed further comprise:
determining, using the sensor, at least a second portion of the user data for each user in the pair, the second portion comprising user-related activity data.

9. The system of claim 1, wherein the user data for each pair of users are programmatically evaluated to determine if a plurality of relationships exist between the users by performing multiple comparisons, each comparison performed on a portion of the user data for each pair of users, and based on each comparison, determining a relationship exists or does not exist between the pair of users.

10. A computerized method to process user-connection data to provide an enhanced computing experience, the method comprising:
processing a graph data structure to determine one or more optimal paths, the graph data structure comprising a plurality of nodes corresponding to user and one or more edges connecting each node to another node, each edge corresponding to a relationship of one of a plurality of relationship types existing between users corresponding to the nodes that are connected by the edge, and each edge having an edge weight representative of a select relationship type of the plurality of relationship types, the processing of the graph structure further comprising:
computing a path cost for each of multiple paths between a first node and a second node that respectively correspond to different relationship types of the plurality of relationship types, the path cost being based on a sum of the edge weights corresponding to edges within the path;
based on the path cost computed for each of multiple paths between the first node and the second node, identify an optimal path between the first node and the second node and a select relationship type corresponding to at least one edge in the optimal path;
detecting an interaction between a first user and a graphical user interface (GUI) element displayed on a user interface of a communication application, the GUI element identifying a second user;
in response to detection of the interaction, querying the graph data structure to identify connection data describing the optimal path extending between the first node and the second node, the connection data identifying:
a user identifier of a third user corresponding to a third node in the path between the first node and the second node;
a relationship type identifier for each edge in the path identifying a relationship between users corresponding to nodes connected by the edge; and
presenting the connection data on the GUI interface.

11. The computerized method of claim 10, wherein the GUI element presents user contact information or identifies attendees to a meeting.

12. The computerized method of claim 10, wherein the graph data structure is processed to determine a plurality of optimal paths; and wherein the connection data is determined based on at least a portion of the plurality of optimal paths.

13. The computerized method of claim 10:
wherein the GUI element identifies attendees to a meeting and presenting the connection data further comprises presenting a subgraph of the graph data structure, the subgraph illustrating connections between the attendees.

14. The computerized method of claim 12, wherein each of the one or more optimal paths comprise a least-cost path; and wherein each edge weight is based on a relationship type for the relationship corresponded to by the edge.

15. The computerized method of claim 13 wherein the subgraph includes a visual indicator of a relationship insight regarding a most-connected user that is determined based on determining a first node that occurs most frequently in the plurality of paths; a first relationship chain that is determined based on a first optimal path that has the least cost among a group of optimal paths, of the plurality of optimal paths, the group of optimal paths comprising each optimal path that has an end node corresponding to the first user; and a second relationship chain that is determined based on a second optimal path having a first end node corresponding to the first user and a second end node corresponding to the first node that occurs most frequently in the plurality of paths.

16. Computer storage media having computer-executable instructions embodied thereon that when executed by at least one computer processor, cause operations to be performed comprising:
processing a graph data structure to determine one or more optimal paths, the graph data structure comprising a plurality of nodes corresponding to users and one or more edges connecting each node to another node, each edge corresponding to a relationship of one of a plurality of relationship types existing between users corresponding to the nodes that are connected by the edge, and each edge having an edge weight representative of a select relationship type of the plurality of relationship types, the processing of the graph structure further comprising:

computing a path cost for each of multiple paths between a first node and a second node that respectively correspond to different relationship types of the plurality of relationship types, the path cost being based on a sum of the edge weights corresponding to edges within the path;

based on the path cost computed for each of multiple paths between the first node and the second node, identify an optimal path between the first node and the second node and a select relationship type corresponding to at least one edge in the optimal path;

detecting an interaction between a first user and a graphical user interface (GUI) element displayed on a user interface of a communication application, the GUI element identifying a second user;

in response to detection of the interaction, querying the graph data structure to identify connection data describing the optimal path extending between the first node and the second node, the connection data identifying:

a user identifier of a third user corresponding to a third node in the path between the first node and the second node;

a relationship type identifier for each edge in the path identifying a relationship between users corresponding to nodes connected by the edge; and presenting the connection data on the GUI interface.

17. The computer storage media of claim 16, wherein the graph data structure is processed to determine a plurality of optimal paths; and wherein the connection data is determined based on at least a portion of the plurality of optimal paths.

18. The computer storage media of claim 16, wherein the GUI element identifies attendees to a meeting and presenting the connection data further comprises presenting a subgraph of the graph data structure, the subgraph illustrating connections between the attendees.

* * * * *